(12) United States Patent
Kikuchi et al.

(10) Patent No.: US 9,061,561 B2
(45) Date of Patent: Jun. 23, 2015

(54) VEHICLE CONTROL DEVICE AND VEHICLE CONTROL METHOD

(71) Applicant: Nissan Motor Co., Ltd., Yokohama-shi, Kanagawa (JP)

(72) Inventors: Hironobu Kikuchi, Isehara (JP); Katsuhiko Hirayama, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/365,664

(22) PCT Filed: Jan. 22, 2013

(86) PCT No.: PCT/JP2013/051171
§ 371 (c)(1),
(2) Date: Jun. 16, 2014

(87) PCT Pub. No.: WO2013/111734
PCT Pub. Date: Aug. 1, 2013

(65) Prior Publication Data
US 2014/0358370 A1 Dec. 4, 2014

(30) Foreign Application Priority Data

Jan. 25, 2012 (JP) ................. 2012-012593
Jan. 25, 2012 (JP) ................. 2012-012594
Jan. 25, 2012 (JP) ................. 2012-012595

(51) Int. Cl.
*B60G 17/018* (2006.01)
*B60G 17/016* (2006.01)
*B60T 13/66* (2006.01)
(Continued)

(52) U.S. Cl.
CPC ............ *B60G 17/016* (2013.01); *B60T 13/662* (2013.01); *B60W 10/06* (2013.01); *B60W 10/184* (2013.01); *B60T 8/17555* (2013.01); *B60T 2260/06* (2013.01); *B60G 17/0165* (2013.01); *B60G 17/0195* (2013.01); *B60G 17/06* (2013.01); *B60G 2400/821* (2013.01); *B60G 2400/91* (2013.01); *B60G 2500/10* (2013.01); *B60W 10/22* (2013.01); *B60W 30/20* (2013.01); *B60W 2030/206* (2013.01); *B60W 2520/16* (2013.01); *B60W 2710/0666* (2013.01); *B60W 2710/182* (2013.01); *B60W 2710/223* (2013.01); *B60W 2710/226* (2013.01); *B60T 7/12* (2013.01)

(58) Field of Classification Search
CPC ................... B60G 17/0195; B60G 2500/10
USPC .......................................................... 701/37
See application file for complete search history.

(56) References Cited

U.S. PATENT DOCUMENTS

2008/0183353 A1* 7/2008 Post et al. .................... 701/42

FOREIGN PATENT DOCUMENTS

| JP | 11-11272 A | 1/1999 |
| JP | 2001-82200 A | 3/2001 |

(Continued)

*Primary Examiner* — James Trammell
*Assistant Examiner* — Michael D Lang
(74) *Attorney, Agent, or Firm* — Global IP Counselors, LLP

(57) ABSTRACT

A driving state estimator unit configured to detect a state quantity indicating vehicle body orientation, and a control unit configured to control vehicle body orientation using drive force from an engine when the absolute value of the amplitude of the detected state quantity is less than a second predetermined value, and using force generated by a second orientation control device instead of the drive force from the engine when the absolute value of the amplitude is equal to or greater than the second predetermined value.

12 Claims, 16 Drawing Sheets

(51) Int. Cl.
*B60W 10/06* (2006.01)
*B60W 10/184* (2012.01)
*B60T 8/1755* (2006.01)
*B60G 17/0165* (2006.01)
*B60G 17/0195* (2006.01)
*B60G 17/06* (2006.01)
*B60W 10/22* (2006.01)
*B60W 30/20* (2006.01)
*B60T 7/12* (2006.01)

(56) References Cited

FOREIGN PATENT DOCUMENTS

| | | |
|---|---|---|
| JP | 2002-115756 A | 4/2002 |
| JP | 2007-237933 A | 9/2007 |
| JP | 2009-184575 A | 8/2009 |
| JP | 2009-247157 A | 10/2009 |
| JP | 2010-83329 A | 4/2010 |

* cited by examiner

VEHICLE CONTROL DEVICE AND VEHICLE CONTROL METHOD

CROSS-REFERENCE TO RELATED APPLICATIONS

This application is a U.S. National stage application of International Application No. PCT/JP2013/051171, filed Jan. 22, 2013, which claims priority to Japanese Patent Application No. 2012-012593 filed in Japan on Jan. 25, 2012, Japanese Patent Application No. 2012-012594 filed in Japan on Jan. 25, 2012, and Japanese Patent Application No. 2012-012595 filed in Japan on Jan. 25, 2012, the contents of each of which are hereby incorporated herein by reference.

BACKGROUND

1. Field of the Invention

The present invention relates to a control device and a control method for controlling the state of a vehicle.

2. Background Information

Japanese Laid-Open Patent Application No. 2009-247157 discloses a technique of controlling vehicle body orientation using drive force from a motive power source.

SUMMARY

However, a problem exists that controlling vehicle body orientation using drive force from a motive power source when a state quantity indicating vehicle body orientation has a high amplitude will lead to large variations in vehicle drive force, creating an unnatural feel for the driver.

An object of the present invention is to provide a vehicle control device and vehicle control method capable of reducing unnatural feel experienced by a driver.

In order to achieve the abovementioned object, a vehicle control device according to the present invention controls vehicle body orientation using a motive power source orientation control device when the absolute value of the amplitude of a detected state quantity is less than a predetermined value, and using a second orientation control device instead of the motive power source orientation control device when the absolute value of the amplitude is equal to or greater than the predetermined value.

As a result, vehicle body orientation is not controlled using drive force from a motive power source when amplitude is high, allowing variations in drive force to be minimized and the level of unnatural feel experienced by a driver to be reduced.

BRIEF DESCRIPTIONS OF THE DRAWINGS

Referring now to the attached drawings which form a part of this original disclosure.

DETAILED DESCRIPTION OF THE EMBODIMENTS (First Embodiment)

Figure 1:
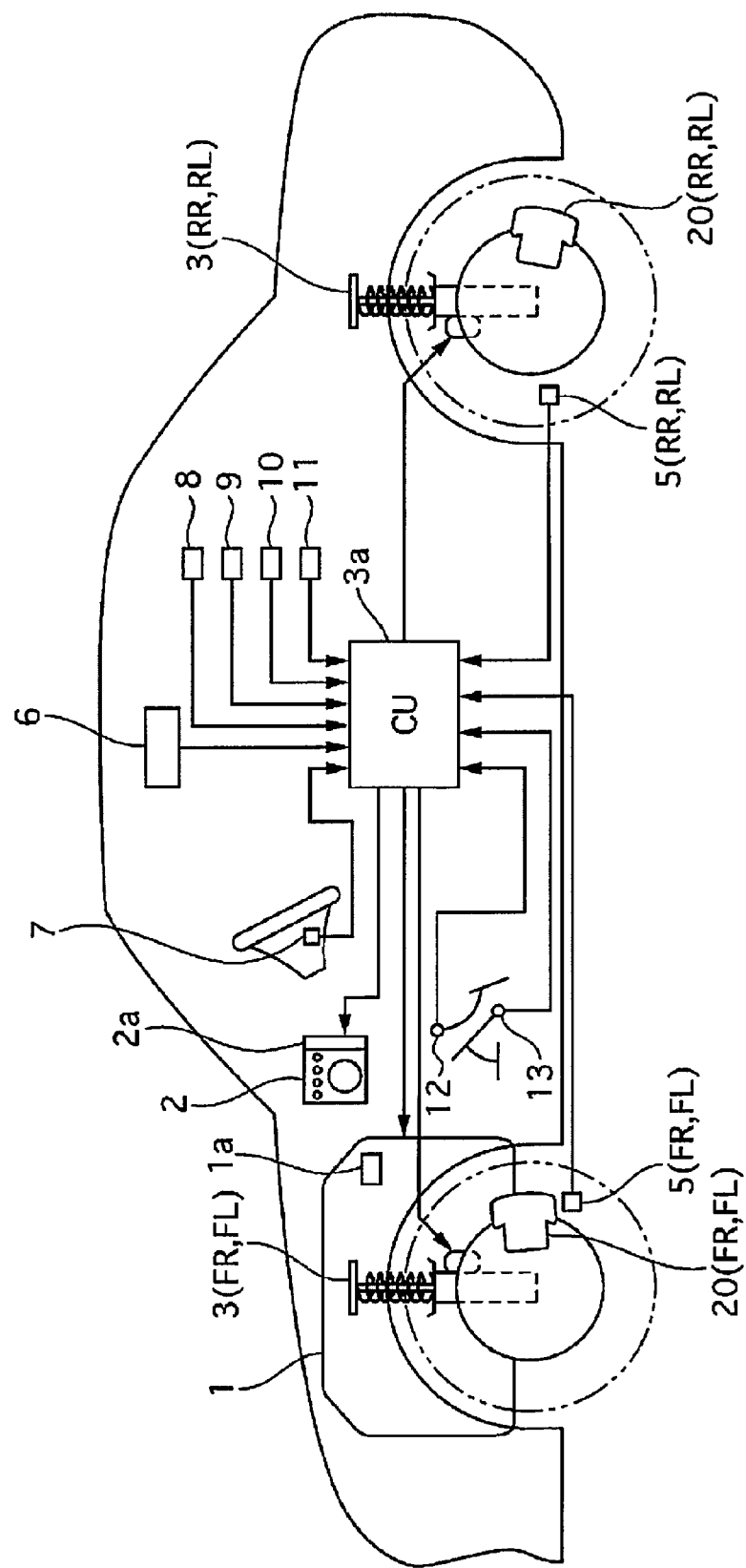
FIG. 1 is a schematic system diagram of a vehicle control device according to a first embodiment.

FIG. 1 is a schematic system diagram of a vehicle control device according to a first embodiment. A vehicle comprises an engine 1 constituting a power source, brakes 20 for generating braking torque by applying frictional force to the wheels (brakes corresponding to individual wheels will be referred to hereafter as follows: front right brake: 20FR; front left brake: 20FL; rear right brake: 20RR; rear left brake: 20RL), and variable-damping-force shock absorbers 3 provided between each of the wheels and the vehicle body ("shock absorber" will be abbreviated "S/A" in the following description; shock absorbers corresponding to individual wheels will be referred to as follows: front right S/A: 3FR; front left S/A: 3FL; rear right S/A: 3RR; rear left S/A: 3RL).

The engine 1 comprises an engine controller 1a (also referred to hereafter as an engine control unit) for controlling the torque outputted by the engine 1; the engine controller 1a controls the engine operation state (engine rpm, engine output torque, etc.) as desired by controlling the opening of the throttle valve, the fuel injection level, the ignition timing, and the like of the engine 1. The brakes 20 generates braking torque on the basis of hydraulic pressure supplied from a brake control unit 2 capable of controlling brake hydraulic pressure for each of the wheels according to driving state. The brake control unit 2 comprises a brake controller 2a (also referred to hereafter as a brake control unit) for controlling the braking torque generated by the brakes 20; the desired hydraulic pressure is generated in the brakes 20 for each of the wheels by the opening and closing of a plurality of solenoid valves using master cylinder pressure generated by a driver operating the brake pedal or pump pressure generated by a built-in motor-driven pump as a hydraulic pressure source.

The S/A 3 are damping force-generating devices for damping the elastic motion of coil springs provided between the unsprung mass (the axles, wheels, etc.) and the sprung mass (vehicle body, etc.) of the vehicle, and the damping force generated thereby can be adjusted by the operation of actuators. Each of the S/As 3 comprises a cylinder in which fluid is sealed, a piston that makes strokes within the cylinder, and an orifice for controlling the movement of the fluid between fluid chambers formed above and below the piston. Orifices of various diameters are formed in the piston, and an orifice corresponding to a control command is selected from the various orifices when the S/A actuator operates. Damping force corresponding to the diameter of the orifice is thereby generated. The movement of the piston will be more easily restricted if the orifice diameter is small, increasing damping force, and movement of the piston will be less easily restricted if the orifice diameter is large, decreasing damping force.

Apart from selecting the diameter of the orifice, damping force may also be set, for example, by disposing a solenoid control valve over a passage linking the fluid chambers formed above and below the piston and controlling the opening and closing of the solenoid control valve; the invention is not particularly limited with respect thereto. Each of the S/As 3 comprises an S/A controller 3a for controlling the damping force of the S/A 3, and damping force is controlled by the operated of the orifice diameter by the S/A actuator.

Also comprised are wheel speed sensors 5 for detecting the wheel speed of each of the wheels (the sensors will be referred to as follows when wheel speeds corresponding to individual wheels are indicated: front right wheel speed: 5FR; front left wheel speed 5FL; rear right wheel speed: 5RR; rear left wheel speed: 5RL), an integrated sensor 6 for detecting forward/reverse acceleration, yaw rate, and lateral acceleration acting upon the center of gravity of the vehicle, a steering angle sensor 7 for detecting a steering angle indicating the amount to which the driver has operated the steering wheel, a vehicle speed sensor 8 for detecting vehicle speed, an engine torque sensor 9 for detecting engine torque, an engine rpm sensor 10 for detecting engine rpm, a master pressure sensor 11 for detecting master cylinder pressure, a brake switch 12 for outputting an on state signal when a brake pedal is operated, and an accelerator opening sensor 13 for detecting the degree to which an accelerator pedal is open. Signals from the various sensors are inputted to the S/A controller 3a. The integrated sensor 6 may be disposed at the center of gravity of the vehicle or at another location without restriction as long as the sensor is capable of estimating various values at the position of the center of gravity. The sensor need not be integrated; individual sensors for detecting yaw rate, forward/reverse acceleration, and lateral acceleration may also be provided.

Figure 2:
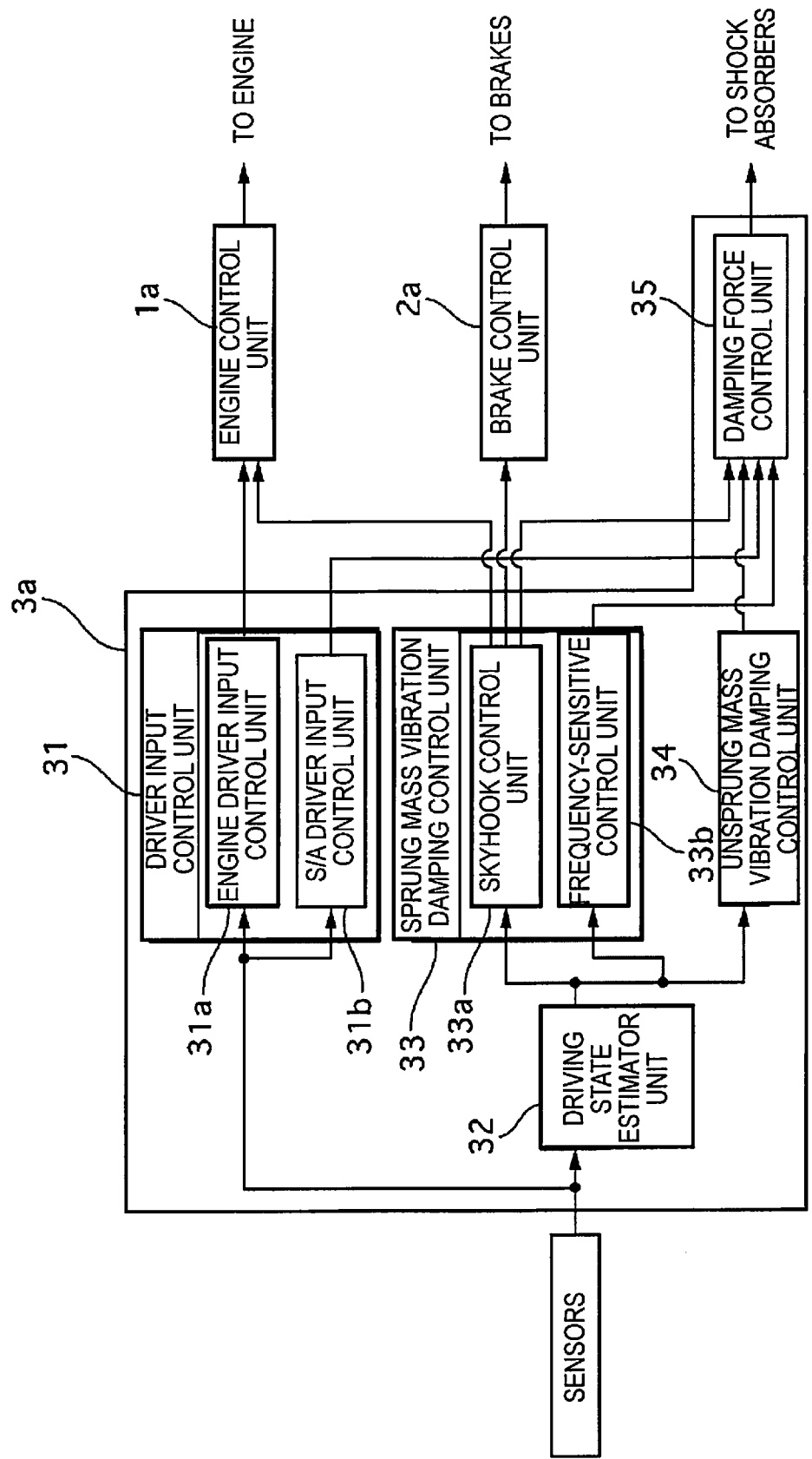
FIG. 2 is a control block diagram showing a configuration of control performed by the vehicle control device according to the first embodiment.

FIG. 2 is a control block diagram showing a configuration of control performed by the vehicle control device according to the first embodiment. The first embodiment comprises three controllers: the engine controller 1a, the brake controller 2a, and the S/A controller 3a. The S/A controller 3a comprises a driver input control unit 31 for performing driver input control so that a desired vehicle orientation is attained on the basis of driver operations (of the steering wheel, accelerator and brake pedals, etc.), a driving state estimator unit 32 for estimating driving state on the basis of values detected by the sensors, a sprung mass vibration damping control unit 33 for controlling the vibrational state of the sprung mass of the vehicle on the basis of the estimated driving state, an unsprung mass vibration damping control unit 34 for controlling the vibrational state of the unsprung mass of the vehicle on the basis of the estimated driving state, and a damping force control unit 35 for deciding upon the damping force to be set for the S/As 3 on the basis of a shock absorber orientation control amount outputted from the driver input control unit 31, a sprung mass vibration damping control amount outputted from the sprung mass vibration damping control unit 33, and an unsprung mass vibration damping control amount outputted from the unsprung mass vibration damping control unit 34, and controlling S/A damping force.

In the first embodiment, three controllers are provided, but the present invention is not particularly limited to such a configuration; for example, the damping force control unit 35 may be provided separately from the S/A controller 3a as an orientation controller for a total of four S/A controllers including the damping force control unit 35, or all the controllers may be combined into a single integrated controller. The configuration of the first embodiment envisions the repurposing of an engine controller and a brake controller in an existing vehicle as an engine control unit 1a and a brake control unit 2a, and the installation of a separate S/A controller 3a to create the vehicle control device according to the first embodiment.

(Overall Configuration of Vehicle Control Device)

Three actuators are used in the vehicle control device according to the first embodiment in order to control the vibrational state of the sprung mass of the vehicle. Because the control performed by each of the activators affects the state of the sprung mass of the vehicle, interference is a problem. In addition, the elements controllable by the engine 1, the elements controllable by the brakes 20, and the elements controllable by the S/As 3 all differ, and the matter of the combinations in which these elements should be controlled is another problem. For example, the brakes 20 are capable of controlling bouncing motion and pitching motion, but controlling both at the same time will create a strong sense of deceleration and tend to create an unnatural feel for the driver. The S/As 3 are capable of absorbing rolling motion, bouncing motion, and pitching motion, but controlling all three of these using the S/As 3 will lead to increased manufacturing costs for the S/As 3, and tends to increase damping force; this facilitates high-frequency vibrational input from the road surface, also creating an unnatural feel for the driver. In other words, a trade-off must be made in that control performed by the brakes 20 will not lead to worse high-frequency vibration but will lead to an increased sense of deceleration, and control performed by the S/As 3 will not create a sense of deceleration but will lead to high-frequency vibrational input.

Thus, a control configuration has been adopted for the vehicle control device of the first embodiment in which a comprehensive assessment is made of these problems in order to draw upon the respective advantages of these control methods so as to complement the weaknesses of the other, thereby yielding a vehicle control device that is both economical and offers superior vibration damping performance. To this end, the following points were taken into consideration in the overall construction of the control system.

(1) The operation of the actuators with regard to pitch control is selectively turned on and off according to the amplitude of the state quantity indicating vehicle body orientation (pitch rate in the first embodiment), thereby striking a better balance in terms of the abovementioned trade-off.

(2) The only type of motion subjected to control by the brakes 20 is pitching motion, thereby eliminating the sense of deceleration produced from control by the brakes 20.

(3) The amount of control performed by the engine 1 and the brakes 20 is restricted to less than the actually outputtable control amount, thereby reducing the burden placed upon the S/As 3 and minimizing the unnatural feel yielded by control performed by the engine 1 and the brakes 20.

(4) Skyhook control is performed by all of the actuators. This allows skyhook control to be inexpensively performed using all of the wheel speed sensors installed in the vehicle, without the use of a stroke sensor, sprung mass vertical acceleration sensor, or the like, as is usually necessary to perform skyhook control.

(5) Scalar control (frequency-sensitive control) has been newly introduced in order to address high-frequency vibrational input, which is difficult to address using skyhook control or other types of vector control, when the S/As 3 are performing sprung mass control.

(6) The control state manifested by the S/As 3 is selected, as appropriate, according to the driving state, thereby providing a control state suited to the driving conditions.

The foregoing has been a summary of the features of the control system according to the embodiment as a whole. The specifics by which each of these individual features will be described in sequence hereafter.

(Driver Input Control Unit)

First, the driver input control unit will be described. The driver input control unit 31 comprises an engine driver input control unit 31a for attaining the vehicle orientation demanded by the driver by controlling the torque of the engine 1, and an S/A driver input control unit 31b for attaining the vehicle orientation demanded by the driver by controlling the damping force of the S/As 3. The engine driver input control unit 31a calculates a ground load variation minimization control amount for minimizing variations in the ground loads of the front wheels and the rear wheels, and a yaw response control amount corresponding to the vehicle behavior desired by the driver on the basis of signals from the steering angle sensor 7 and the vehicle speed sensor 8.

The S/A driver input control unit 31b calculates a driver input damping force control amount corresponding to the vehicle behavior desired by the driver on the basis of the signals from the steering angle sensor 7 and the vehicle speed sensor 8, and outputs this amount to the damping force control unit 35. If, for example, the nose of the vehicle rises while the driver is turning, the driver's field of view can easily be taken off the road; in such cases, the damping force of the four wheels is outputted as the driver input damping force control amount so as to prevent the nose from rising. A driver input damping force control amount for minimizing rolling generating during turning is also outputted.

(Controlling Rolling Via S/A Driver Input Control)

Figure 3:
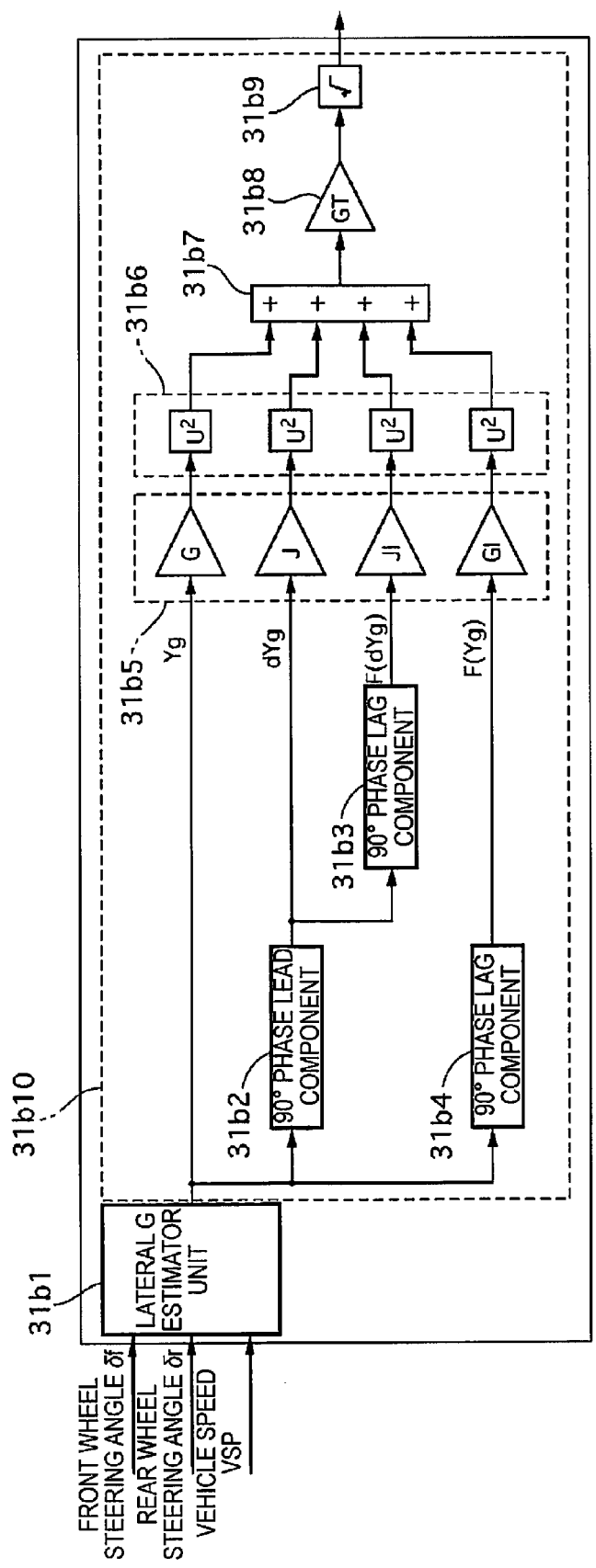
FIG. 3 is a control block diagram showing a configuration of roll rate minimization control according to the first embodiment.

Roll minimization control performed via S/A driver input control will now be described. FIG. 3 is a control block diagram showing a configuration of roll rate minimization control according to the first embodiment. A lateral acceleration estimator unit 31b1 estimates lateral acceleration Yg on the basis of a front wheel steering angle δf detected by the steering angle sensor 7, a rear wheel steering angle δr (the actual rear wheel steering angle if a rear wheel steering device is provided; otherwise, 0 as appropriate), and vehicle speed VSP detected by the vehicle speed sensor 8. The lateral acceleration Yg is calculated according to the following formula using an estimated yaw rate value γ.

$$Yg = VSp \cdot \gamma$$

The estimated yaw rate value γ is calculated according to the following formula:

$$\left\{ \begin{array}{c} \beta \\ \gamma \end{array} \right\} = N \left\{ \begin{array}{c} \delta_f \\ \delta_r \end{array} \right\}$$

$$\left\{ \begin{array}{c} \beta \\ \gamma \end{array} \right\} = M^{-1} N \left\{ \begin{array}{c} \delta_f \\ \delta_r \end{array} \right\}$$

wherein $$M = \begin{bmatrix} m_{11} & m_{12} \\ m_{21} & m_{22} \end{bmatrix}, N = \begin{bmatrix} n_{11} & n_{12} \\ n_{21} & n_{22} \end{bmatrix}$$

$$m_{11} = -(Ktf \cdot Lf - Ktv \cdot Lv)$$

$$m_{12} = -\frac{1}{V}(Ktf \cdot Lf^2 - Ktv \cdot Lv^2)$$

$$m_{21} = -2(Ktf + Ktv)$$

$$m_{22} = -\frac{2}{V}(Ktf \cdot Lf - Ktv \cdot Lv) - M \cdot V$$

$$n_{11} = -Ktf \cdot Lf$$

$$n_{12} = Ktv \cdot Lr$$

$$n_{21} = -2 \cdot Ktf$$

$$n_{22} = -2 \cdot Ktv$$

vehicle body slide angle: β
vehicle body yaw rate: γ
front wheel steering angle: δf
rear wheel steering angle: δr
vehicle body: V
front wheel CP: Ktf
rear wheel CP: Ktv
distance between front axle and center of gravity: Lf
distance between rear axle and center of gravity: Lr
vehicle body mass: M A 90° phase lead component-generating unit 31b2 differentiates the estimated lateral acceleration Yg and outputs a lateral acceleration derivative dYg. A 90° phase lag component-generating unit 31b3 outputs a component F(dYg) in which the phase of the lateral acceleration derivative dYg is delayed 90°. In the component F(dYg) 90°, the phase of the component from which the low-frequency region has been removed generated by the phase lead component-generated unit 31b2 is returned to the phase of the lateral acceleration Yg, and the DC is cut from the lateral acceleration Yg; i.e., the component is a transitional component of lateral acceleration Yg. A 90° phase lag component-generating unit 31b4 outputs a component F(Yg) in which the phase of the lateral acceleration Yg is delayed 90°. A gain multiplier unit 31b5 multiplies the lateral acceleration Yg, lateral acceleration derivative dYg, lateral acceleration DC-cut component F(dYg), and 90° phase lag component F(Yg) by gain. Gain is set according to the roll rate transfer function for the steering angle. Gain may also be adjusted according to four control modes described hereafter. A square calculator unit 31b6 squares and outputs the components having been multiplied by gain. A synthesizer unit 31b7 adds the values outputted by the squaring processor unit 31b6. A gain multiplier unit 31b8 multiplies the square of the summed components by gain, and outputs the results. A square root calculator unit 31b9 calculates the square root of the value outputted by the gain multiplier unit 31b7, thereby calculating a driver input orientation control amount for use in roll rate minimization control, and outputs the amount to the damping force control unit 35.

The 90° phase lead component-generating unit 31b2, 90° phase lag component-generating unit 31b3, 90° phase lag component-generating unit 31b4, gain multiplier unit 31b5, square calculator unit 31b6, synthesizer unit 31b7, gain multiplier unit 31b8, and square root calculator unit 31b9 constitute a Hilbert transform unit 31b10 for generating an envelope waveform using a Hilbert transform.

Figure 4:
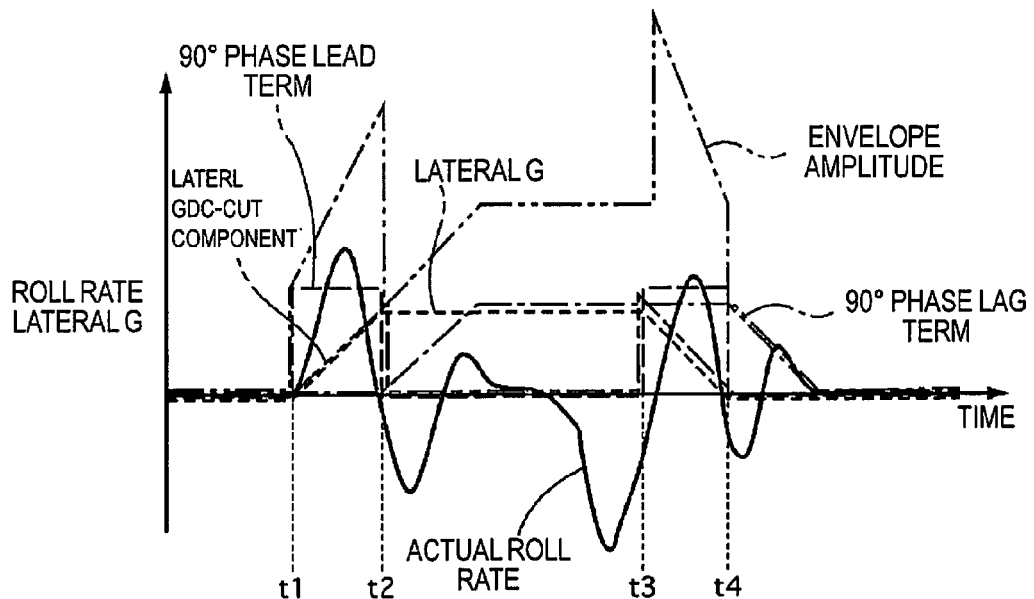
FIG. 4 is a time chart showing an envelope waveform formation process performed in the roll rate minimization control of the first embodiment.

FIG. 4 is a time chart showing an envelope waveform formation process performed in the roll rate minimization control of the first embodiment. When a driver begins steering at time t1, a roll rate gradually begins to be generated. At this point, the 90° phase lead component dYg is added to form an envelope waveform, and the driver input orientation control amount is calculated on the basis of the envelope waveform-based scalar quantity, thereby allowing roll rate generation during the initial stage of steering to be minimized. In addition, by adding the lateral acceleration DC-cut component F(dYg) to form the envelope waveform, roll rates generated during transitional states, such as when the driver is beginning or ending steering, can be efficiently minimized. In other words, damping force is not excessively increased and degradation in ride comfort can be avoided during constant turning states in which roll is stably generated.

Next, when the driver holds the steering wheel in place at time t2, the 90° phase lead component dYG and the lateral acceleration DC-cut component F(dYg) disappear, and the 90° phase lag component F(Yg) is then added. At this time, a roll rate resonance component equivalent to the roll aftershock is generated after rolling occurs, even if there is little change in the roll rate itself in a steady steering state. If the phase lag component F(Yg) were not added, damping force would be set to a low value from time t2 to time t3, risking destabilization of vehicle behavior by the roll rate resonance component. The 90° phase lag component F(Yg) is added in order to minimize the roll rate resonance component.

When the driver shifts from the held steering state back to a straight-ahead driving state at time t3, the lateral acceleration Yg decreases, and the roll rate is reduced to a low value. The action of the 90° phase lag component F(Yg) also ensures damping force at this point as well, allowing destabilization due to the roll rate resonance component to be avoided.

(Driving State Estimator Unit)

Figure 5:
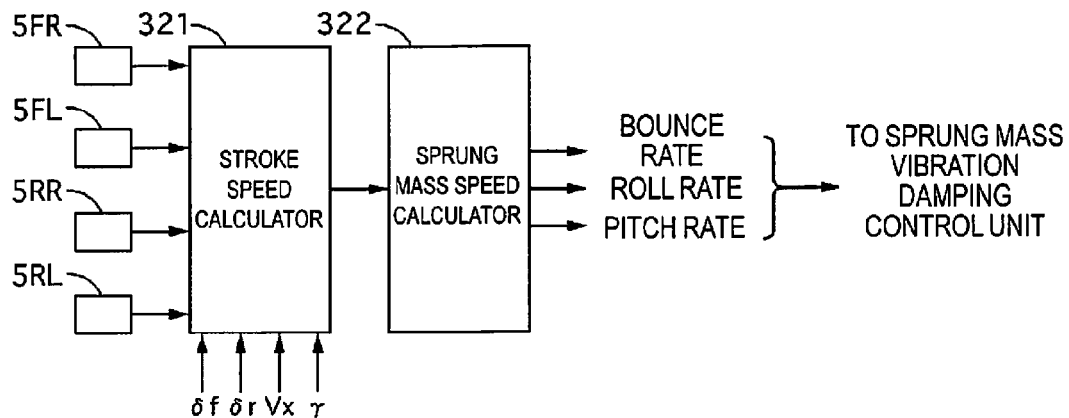
FIG. 5 is a control block diagram showing the configuration of a driving state estimator unit of the first embodiment.

Next, the driving state estimator unit will be described. FIG. 5 is a control block diagram showing the configuration of a driving state estimator unit of the first embodiment. The driving state estimator unit 32 of the first embodiment calculates a stroke speed, bounce rate, roll rate, and pitch rate for each wheel used in the skyhook control performed by the sprung mass vibration damping control unit 33 as described hereafter primarily on the basis of the wheel speeds detected by the wheel speed sensors 5. The values from the wheel speed sensors 5 of the wheels are inputted into a stroke speed calculator unit 321, and sprung mass speed is calculated by the stroke speed calculator unit 321 from the stroke speeds calculated for the wheels.

Figure 6:
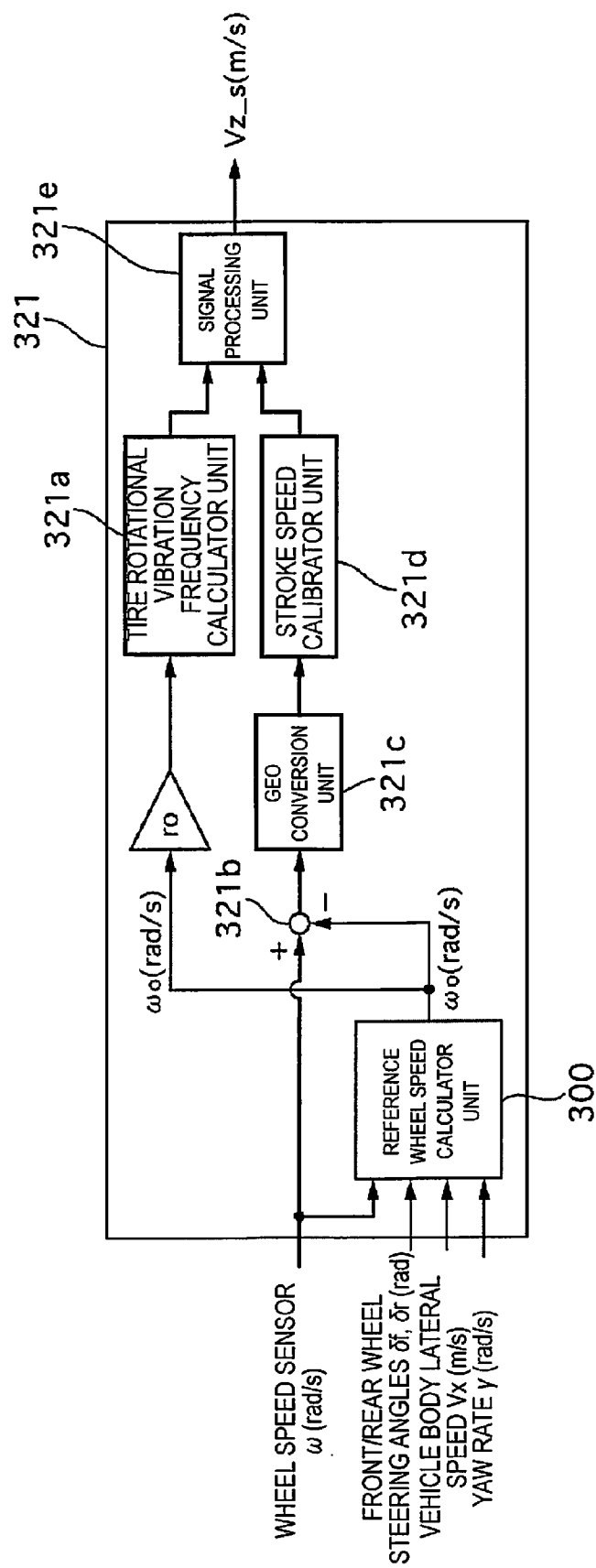
FIG. 6 is a control block diagram showing the specifics of control in a stroke speed calculator unit of the first embodiment.

FIG. 6 is a control block diagram showing the specifics of control in a stroke speed calculator unit of the first embodiment. A stroke speed calculator unit 321 is separately provided for each wheel; the control block diagram shown in FIG. 6 focuses on a specific wheel. The stroke speed calculator unit 321 comprises a reference wheel speed calculator unit 300 for calculating a reference wheel speed on the basis of the values from the wheel speed sensors 5, the front wheel steering angle δf detected by the steering angle sensor 7, a rear wheel steering angle δr (the actual rear wheel steering angle if a rear wheel steering device is provided, 0 otherwise), a vehicle body lateral speed, and an actual yaw rate detected by the integrated sensor 6, a tire rotational vibration frequency calculator unit 321a for calculating tire rotational vibration frequency on the basis of the calculated reference wheel speed, a deviation calculator unit 321b for calculating the deviation between the reference wheel speed and the value from the wheel speed sensor (i.e., wheel speed variation), a GEO conversion unit 321c for converting the deviation calculated by the deviation calculator unit 321b to a suspension stroke amount, a stroke speed calibrator unit 321d for calibrating the converted stroke amount to a stroke speed, and a signal processing unit 321e for applying a band elimination filter corresponding to the frequency calculated by the tire rotational vibration frequency calculator unit 321a to the calibrated value yielded by the stroke speed calibrator unit 321d to eliminate a primary tire rotational vibration component and calculate a final stroke speed.

(Reference Wheel Speed Calculator Unit)

Figure 7:
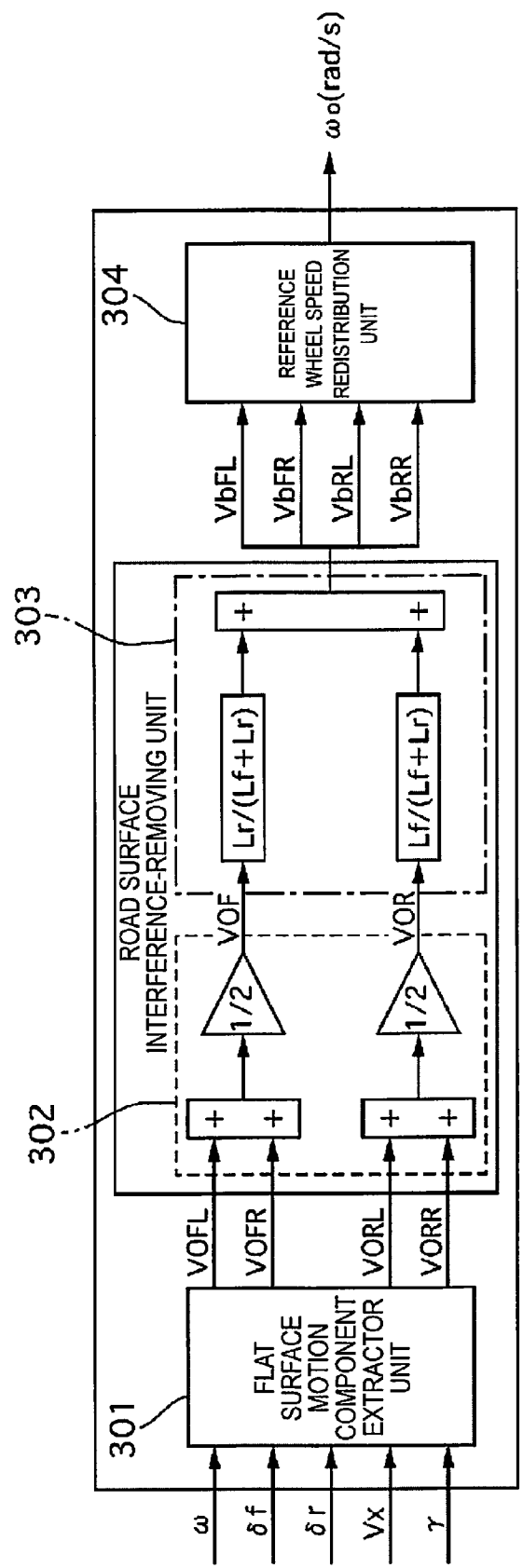
FIG. 7 is a block diagram showing the configuration of a reference wheel speed calculator unit of the first embodiment.

The reference wheel speed calculator unit 300 will now be described. FIG. 7 is a block diagram showing the configuration of a reference wheel speed calculator unit of the first embodiment. The reference wheel speed is a wheel speed from which various types of interference from the individual wheels have been removed. In other words, the difference between the value from the wheel speed sensor and the reference wheel speed is related to a component that varies according to a stroke generated by vehicle body bouncing motion, rolling motion, pitching motion, or unsprung vertical vibration; in the present embodiment, the stroke speed is calculated on the basis of this difference.

A flat surface motion component extractor unit 301 uses the wheel speed sensor values as inputs to calculate a first wheel speed V0 as a reference wheel speed for each of the wheels on the basis of the vehicle body plan view model. ω (rad/s) is the wheel speed sensor detected by the wheel speed sensor 5, δf (rad) is a front wheel actual steering angle detected by the steering angle sensor 7, δr (rad) is a rear wheel actual steering angle, Vx is vehicle body lateral speed, γ (rad/s) is the yaw rate detected by the integrated sensor 6, V (m/s) is a vehicle body speed estimated from the calculated reference wheel speed ω0, VFL, VFR, VRL, and VRR are the reference wheel speeds to be calculated, Tf is a front wheel treat, Tr is a rear wheel treat, Lf is the distance from the position of the vehicle center of gravity to the front wheels, and Lr is the distance from the position of the vehicle center of gravity to the rear wheel. The vehicle body plan view model is expressed as follows using the symbols described above.

$$VFL = (V - Tf/2 \cdot \gamma)\cos \delta f + (Vx + Lf \cdot \gamma)\sin \delta f$$

$$VFR = (V + Tf/2 \cdot \gamma)\cos \delta f + (Vx + Lf \cdot \gamma)\sin \delta f$$

$VRL=(V-Tr/2\cdot\gamma)\cos \delta r+(Vx-Lr\cdot\gamma)\sin \delta r$ $VRR=(V+Tr/2\cdot\gamma)\cos \delta r+(Vx-Lr\cdot\gamma)\sin \delta r$ (Formula 1)

If a normal driving state in which no lateral sliding of the vehicle occurs is hypothesized, 0 may be inputted for the vehicle body lateral speed Vx. This yields the following formulas when the various formulas are rewritten with values based on V. When rewriting in this manner, V is written as V0FL, V0FR, V0RL, and V0RR (equivalent to first wheel speeds) as values corresponding to the various wheels.

$V0FL=\{VFL-L\cdot\gamma \sin \delta f\}/\cos \delta f+Tf/2\cdot\gamma$ $V0FR=\{VFR-Lf\cdot\gamma \sin \delta f\}/\cos \delta f-Tf/2\cdot\gamma$ $V0RL=\{VRL+Lr\cdot\gamma \sin \delta r\}/\cos \delta r+Tr/2\cdot\gamma$ $V0RR=\{VRR+Lf\cdot\gamma \sin \delta f\}/\cos \delta R-Tr/2\cdot\gamma$ (Formula 2)

A roll interference-removing unit 302 uses the first wheel speed V0 as an input to calculate second wheel speeds V0F, V0R as reference wheel speeds for the front and rear wheels on the basis of a vehicle body front view model. The vehicle body front view model is used to remove wheel speed differences generated by rolling motion occurring around a center of roll rotation on a normal line passing through the vehicle center of gravity as viewed from the front of the vehicle, and is represented as follows.

$V0F=(V0FL+V0FR)/2$ $V0R=(V0RL+V0RR)/2$

This yields second wheel speeds V0F, V0R from which roll-based interference has been removed.

A pitch interference-removing unit 303 uses the second wheel speeds V0F, V0R as inputs to calculate third wheel speeds VbFL, VbFR, VbRL, and VbRR constituting reference wheel speeds for all the wheels according to a vehicle body side view model. The vehicle body side view model is used to remove wheel speed differences generated by pitching motion occurring around a center of pitch rotation on a normal line passing through the vehicle center of gravity as viewed from the side of the vehicle.

$VbFL=VbFR=VbRL=VbRR=\{Lr/(Lf+Lr)\}V0F+\{Lf/(Lf+Lr)\}V0R$ (Formula 3)

A reference wheel speed redistribution unit 304 uses VbFL (=VbFR=VbRL=VbRR) for V in the vehicle body plan view model shown in formula 1 to calculate final reference wheel speeds VFL, VFR, VRL, VRR for each wheel, which are divided by the tire radius r0 to calculate the reference wheel speed ω0.

Once the reference wheel speed ω0 has been calculated according to the process described above, the deviation between the reference wheel speed ω0 and the wheel speed sensor value is calculated; the deviation represents a wheel speed variation arising from suspension strokes, and is therefore converted into a stroke speed Vzs. As a rule, not only does a suspension make strokes in the vertical direction when holding the wheels, but the wheel rotational centers move forwards and backwards as strokes occur, and the axles equipped with the wheel speed sensors 5 become tilted, creating a difference in rotational angle with the wheels. Because this forward and backward motion leads to changes in wheel speed, deviations between the reference wheel speed and the wheel speed sensor value can be extracted as stroke-induced variations. The degree of variation that occurs can be set, as appropriate, according to the suspension geometry.

Once the stroke speed calculator unit 321 has calculated the stroke speeds Vz_sFL, Vz_sFR, Vz_sRL, Vz_sRR for each wheel according to the process described above, a sprung mass speed calculator unit 322 calculates a bounce rate, roll rate, and pitch rate for use in skyhook control.

(Estimation Model)

In skyhook control, damping force is set according to the relationship between the stroke speeds of the S/As 3 and the sprung mass speed, and the orientation of the sprung mass is controlled to achieve a flat driving state. In order to achieve control of the orientation of the sprung mass via skyhook control, feedback on the sprung mass speed is necessary. Stroke speed is a value detectable from the wheel speed sensor 5; since a sensor for the vertical acceleration of the sprung mass is not provided, the sprung mass speed must be estimated using an estimation model. Problems involved in the estimation model and the appropriate model configuration to adopt will now be discussed.

Figure 8A:
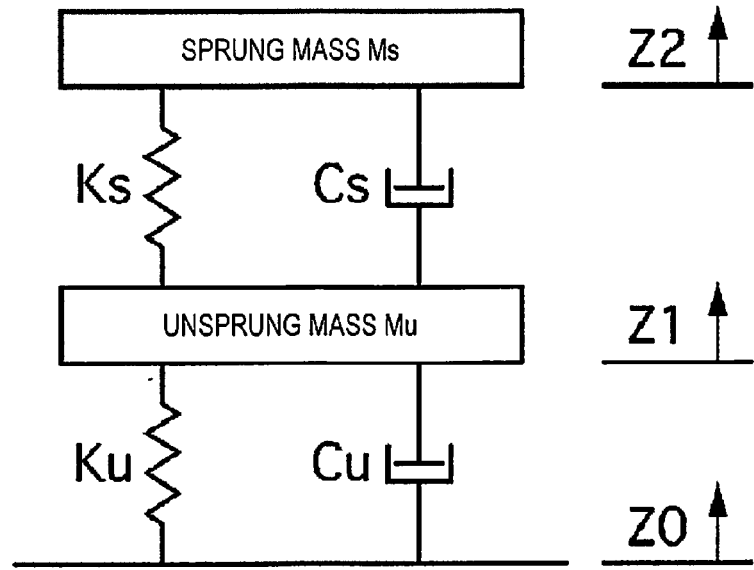
FIGS. 8A and 8B are schematic diagrams of a vehicle body vibration model.
Figure 8B:
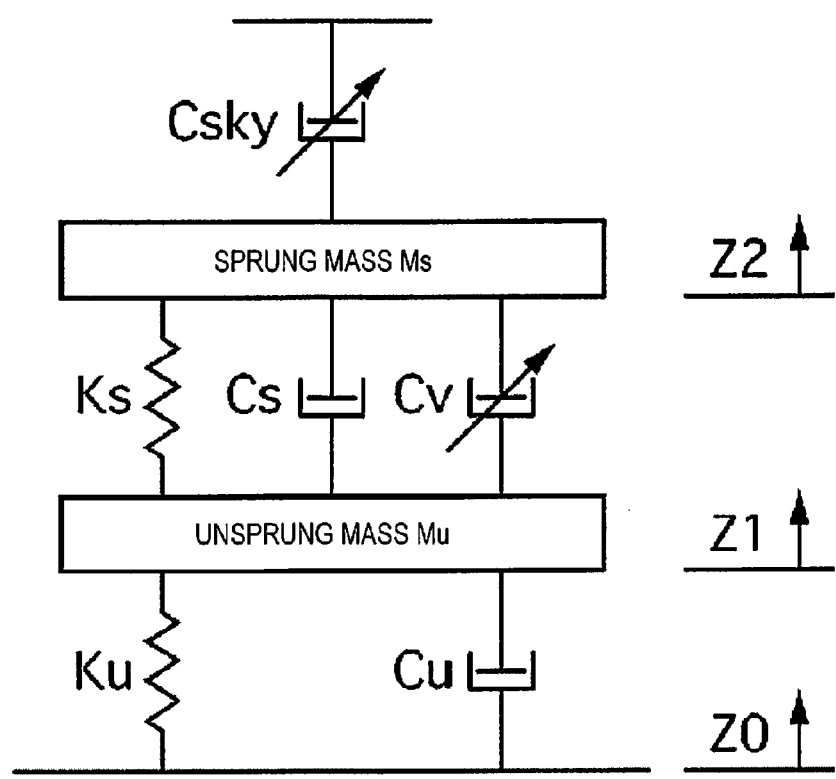

FIGS. 8A and 8B are schematic diagrams of a vehicle body vibration model. FIG. 8A is a model for a vehicle provided with S/As of constant damping force (hereafter referred to as a conventional vehicle), and FIG. 8B is a model for a vehicle provided with variable S/As in which skyhook control is performed. In FIGS. 8A and 8B, Ms indicates sprung mass, Mu indicates unsprung mass, Ks indicates coil spring modulus of elasticity, Cs indicates S/A damping coefficient, Ku indicates unsprung (tire) modulus of elasticity, Cu indicates unsprung (tire) damping coefficient, and Cv indicates a variable damping coefficient. z2 indicates the position of the sprung mass, z1 indicates the position of the unsprung mass, and z0 indicates the position of the road surface.

If the conventional vehicle model shown in FIG. 8A is used, the equation of motion for the sprung mass is expressed as follows. The first-order differential for z1 (i.e., speed) is represented by dz1, and the second-order differential (i.e., acceleration) is represented by ddz1.

$Ms\cdot ddz2=-Ks(z2-z1)-Cs(dz2-dz1)$ (Estimation formula 1)

Applying a Laplace transform to this relationship yields the following formula.

$dz2=-(1/Ms)\cdot(1/S^2)\cdot(Cs\cdot s+Ks)(dz2-dz1)$ (Estimation formula 2)

Because dz2−dz1 is stroke speed (Vz_sFL, Vz_sFR, Vz_sRL, Vz_sRR), the sprung mass speed can be calculated from the stroke speed. However, adjusting damping force via skyhook control will vastly reduce estimation precision, creating the problem that a large orientation control force (damping force adjustment) cannot be applied in the conventional vehicle model.

Thus, the use of a skyhook control-based vehicle model shown in FIG. 8B is conceivable. As a rule, altering damping force involves altering the force limiting the piston movement speed of the S/As 3 as suspension strokes occur. Because semi-active S/As 3 in which the pistons cannot be actively moved in a desired direction, a semi-active skyhook model is used; calculating sprung mass speed yields the following formula.

$dz2=-(1/Ms)\cdot(1/s^2)\cdot\{(CS+CV)\cdot s+Ks\}(dz2-dz1)$ (Estimation formula 3)

wherein:
if $dz2\cdot(dz2-dz1)>0$, $Cv=Csky\cdot\{dz21(dz2-dz1)\}$, and
if $dz2\cdot(dz2-dz1)<0$, $Cv=0$.
That is, Cv is a discontinuous value.

If the semi-active skyhook model is viewed as a filter when one wishes to estimate sprung mass speed using a simple filter, the variables are equivalent to filter coefficients, and a variable damping coefficient Cv that is discontinuous in the pseudo-differential term $\{(Cs+Cv)\cdot s+Ks\}$; thus, filter response is unstable, and suitable estimation precision cannot be obtained. In particular, unstable filter response will lead to phase shifting. Skyhook control cannot be achieved if the correspondence between the phase and the sign for sprung mass speed breaks down. The decision was thus made to estimate sprung mass speed using an active skyhook model, in which a stable Csky can be directly used without relying upon the sign relationship between sprung mass speed and the stroke speed even if semi-active S/As 3 are used. The use of an active skyhook model to calculate sprung mass speed can be expressed as follows.

$$dz2=-(1/s)\cdot\{1/(s+Csky/Ms)\}\cdot\{(Cs/Ms)s+(Ks/Ms)\}(dz2-dz1) \quad \text{(Estimation formula 4)}$$

In this case, there is no discontinuity in the pseudo-differential term $\{(Cs/Ms)s+(Ks/Ms)\}$, and the term $\{1/(s+Csky/Ms)\}$ can be constituted using a low-pass filter. Filter response is therefore stable, and suitable estimation precision is obtainable. It should be noted that, even if an active skyhook model is adopted, only semi-active control is actually possible; thus, the controllable range is halved. The estimated sprung mass speed is therefore less than the actual speed in the frequency band from sprung mass resonance down. However, it is the phase that is most vital in the context of skyhook control, and skyhook control can be achieved as long as the correspondence between phase and sign can be maintained; this is unproblematic because the sprung mass speed can be adjusted using the other coefficients or the like.

It is apparent from the relationship described above that sprung mass speed can be estimated if the stroke speeds for each wheel are known. Because an actual vehicle has not one wheel, but four, we will now consider using the stroke speeds for each wheel to estimate the state of the sprung mass divided into roll rate, pitch rate, and bounce rate modes. When calculating the abovementioned three components from the stroke speeds of the four wheels, one corresponding component is lacking, leading to an indefinite solution; thus, warp rate, which indicates the movement of diagonally opposed wheels, has been introduced. Defining xsB as the bounce term of the stroke amount, xsR as the roll term, xsP as the pitch term, xsW as the warp term, and z_sFL, z_sFR, z_sRL, z_sRR as stroke amounts corresponding to Vz_sFL, Vz_sFR, Vz_sRL, Vz_sRR, the following formula arises.

$$\begin{Bmatrix} z\_sFL \\ z\_sFR \\ z\_sRL \\ z\_sRR \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix} \begin{bmatrix} xsB \\ xsR \\ xsP \\ xsW \end{bmatrix} \Rightarrow \begin{Bmatrix} xsB \\ xsR \\ xsP \\ xsW \end{Bmatrix} \quad \text{(Formula 1)}$$

$$= \begin{bmatrix} 1 & 1 & -1 & -1 \\ 1 & -1 & -1 & 1 \\ 1 & 1 & 1 & 1 \\ 1 & -1 & 1 & -1 \end{bmatrix}^{-1} \begin{Bmatrix} z\_sFL \\ z\_sFR \\ z\_sRL \\ z\_sRR \end{Bmatrix}$$

In view of the relationship shown above, the differentials dxsB, ... of xsB, xsR, xsP, xsW are expressed by the following formulas.

$$dxsB=1/4(Vz\_sFL+Vz\_sFR+Vz\_sRL+Vz\_sRR)$$

$$dxsR=1/4(Vz\_sFL-Vz\_sFR+Vz\_sRL-Vz\_sRR)$$

$$dxsP=1/4(-Vz\_sFL-Vz\_sFR+Vz\_sRL+Vz\_sRR)$$

$$dxsW=1/4(-Vz\_sFL+Vz\_sFR+Vz\_sRL-Vz\_sRR)$$

The relationship between sprung mass speed and stroke speed is obtained from estimation formula 4 above; thus, taking G as the section of estimation formula 4 reading—$(1/s)\cdot\{1/(s+Csky/Ms)\}\cdot\{(Cs/Ms)s+(Ks/Ms)\}$, GB, GR, and GP as values taking into account modal parameters (CskyB, CskyR, CskyP, CsB, CsR, CsP, KsB, KsR, KsP) for the bounce terms, roll terms, and pitch terms of Csky, Cs, and Ks, respectively, dB as bounce rate, dR as roll rate, and dP as pitch rate, dB, dR, and dP can be calculated as follows.

$$dB=GB\cdot dxsB$$

$$dR=GR\cdot dxsR$$

$$dP=GP\cdot dxsP$$

As shown from the foregoing, the state of the sprung mass of an actual vehicle can be estimated on the basis of the stroke speeds for the various wheels.

(Sprung Mass Vibration Damping Control Unit)

Next, the configuration of the sprung mass vibration damping control unit 33 will be described. As shown in FIG. 2, the sprung mass vibration damping control unit 33 comprises a skyhook control unit 33a for controlling orientation according to the estimated value for sprung mass speed described above, and a frequency-sensitive control unit 33b for minimizing sprung mass vibration on the basis of the road surface input frequency.

(Configuration of Skyhook Control Unit)

The vehicle control device according to the first embodiment comprises three actuators for achieving sprung mass orientation control in the form of the engine 1, the brakes 20, and the S/As 3. Of these, bounce rate, roll rate, and pitch rate are the objects of control for the S/As 3, bounce rate and pitch rate are the objects of control for the engine 1, and pitch rate is the object of control for the brakes 20 in the skyhook control unit 33a. In order to allocate control amounts to a plurality of actuators that act in different manners and control the state of the sprung mass, a shared control amount must be used for each. In the first embodiment, the control amount for each of the actuators can be determined by using the sprung mass speed estimated by the driving state estimator unit 32.

Bounce-directional skyhook control amount:

$$FB=CskyB\cdot dB$$

Roll-directional skyhook control amount:

$$FR=CskyR\cdot dR$$

Pitch-directional skyhook control amount:

$$FP=CskyP\cdot dP$$

FB is sent to the engine 1 and the S/As 3 as the bounce orientation control amount. FR is for control performed only by the S/As 3, and so is sent to the damping force control unit 35 as a roll orientation control amount.

Figure 9:
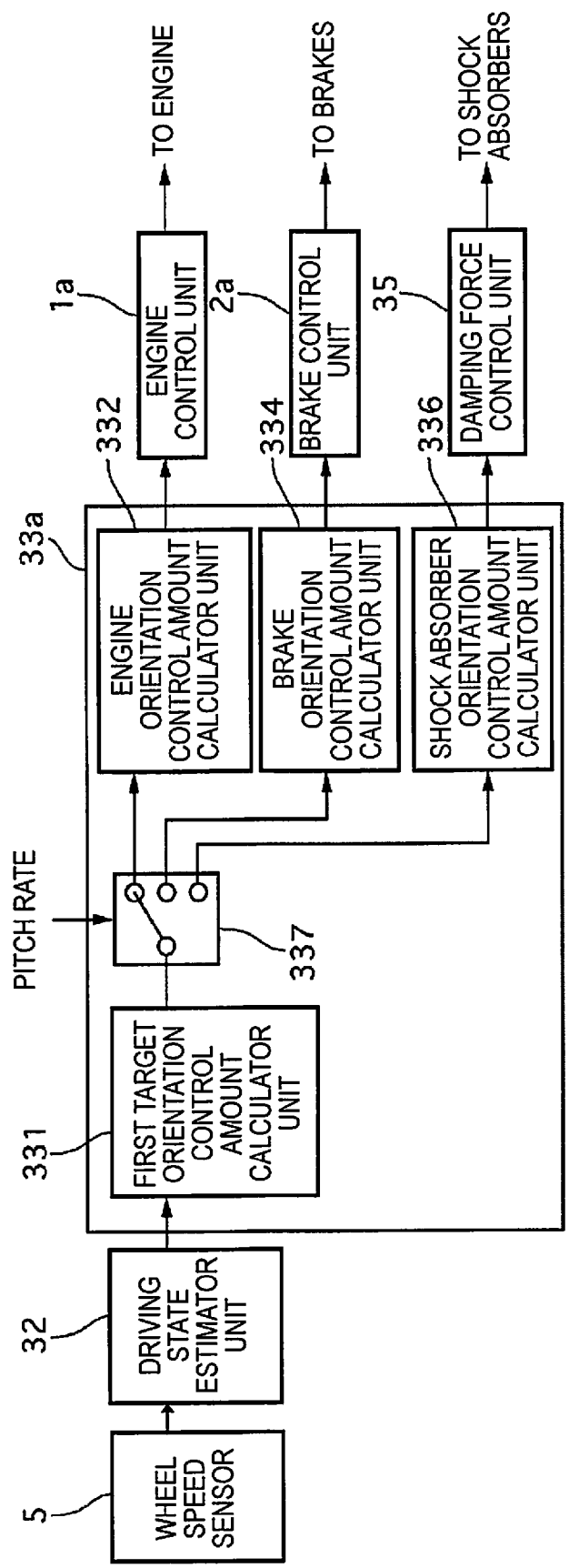
FIG. 9 is a control block diagram of actuator control amount calculation processes performed during pitch control in the first embodiment.

Next, the pitch-directional skyhook control amount FP will be described. Pitch control is performed by the engine 1, the brakes 20, and the S/As 3. FIG. 9 is a control block diagram of actuator control amount calculation processes performed during pitch control in the first embodiment. The skyhook control unit 33a comprises a first target orientation control amount calculator unit 331 for calculating a target pitch rate constituting a first target orientation control amount that is a control amount that can used in common for all of the actuators, an engine orientation control amount calculator unit 332 for calculating the engine orientation control amount achieved by the engine 1, a brake orientation control amount calculator unit 334 for calculating the brake orientation control amount achieved by the brakes 20, an S/A orientation control amount calculator unit 336 for calculating the S/A orientation control amount achieved by the S/As 3, and an operation switching unit 337 for selectively turning the operation of the actuators with respect to pitch control on and off.

As the skyhook control according to the present system gives foremost priority to pitch rate minimization, the first target orientation control amount calculator unit 331 outputs pitch rate without further modification (hereafter, this pitch rate will be referred to as the first target orientation control amount).

The pitch rate calculated by the driving state estimator unit 32 is inputted into the operation switching unit 337. If the absolute value of the amplitude of the pitch rate is less than a first predetermined value, the first target orientation control amount outputted from the first target orientation control amount calculator unit 331 is outputted to the engine orientation control amount calculator unit 332. If the absolute value of the amplitude of the pitch rate is less than a second predetermined value that is greater than the first predetermined value, the first target orientation control amount is outputted to the S/A orientation control amount calculator unit 336. If the absolute value of the amplitude of the pitch rate is equal to or greater than the second predetermined value, the first target orientation control amount is outputted to the brake orientation control amount calculator unit 334.

The engine orientation control amount 332 calculator unit calculates the engine orientation control amount, which is the control amount achievable by the engine 1, on the basis of the inputted first target orientation control amount. A limit value that limits the engine torque control amount according to the engine orientation control amount so as not to create an unnatural feel for the driver is set in the engine orientation control amount calculator unit 332. The engine torque control amount is thus kept within a predetermined forward/reverse acceleration range when converted to forward/reverse acceleration. The engine control unit 1a calculates the engine torque control amount on the basis of the engine orientation control amount corresponding to the limit value, and outputs this amount to the engine 1.

The brake orientation control amount calculator unit 334 calculates the brake orientation control amount, which is the control amount achievable by the brakes 20, on the basis of the inputted first target orientation control amount. A limit value for limiting the braking torque control amount so as not to create an unnatural feel for the driver, as in the case of the engine 1, is set in the brake orientation control amount calculator unit 334 (this limit value will be discussed in detail hereafter). The braking torque control amount is thus kept within a predetermined forward/reverse acceleration range when converted to forward/reverse acceleration (with the limit value being calculated on the basis of naturalness of ride feel for passengers, actuator lifespan, etc.). The brake control unit 2a calculates a braking torque control amount (or deceleration) on the basis of the brake orientation control amount corresponding to the limit value, and is outputted to the brake control unit 2.

The S/A orientation control amount calculator unit 336 calculates the pitch orientation control amount for the S/As 3 on the basis of the inputted first target orientation control amount. The damping force control unit 35 calculates the damping force control amount on the basis of the bounce orientation control amount, the roll orientation control amount, and the pitch orientation control amount (hereafter collectively referred to as the S/A orientation control amounts), and outputs this amount to the S/As 3.

(Brake Pitch Control)

Figure 10:
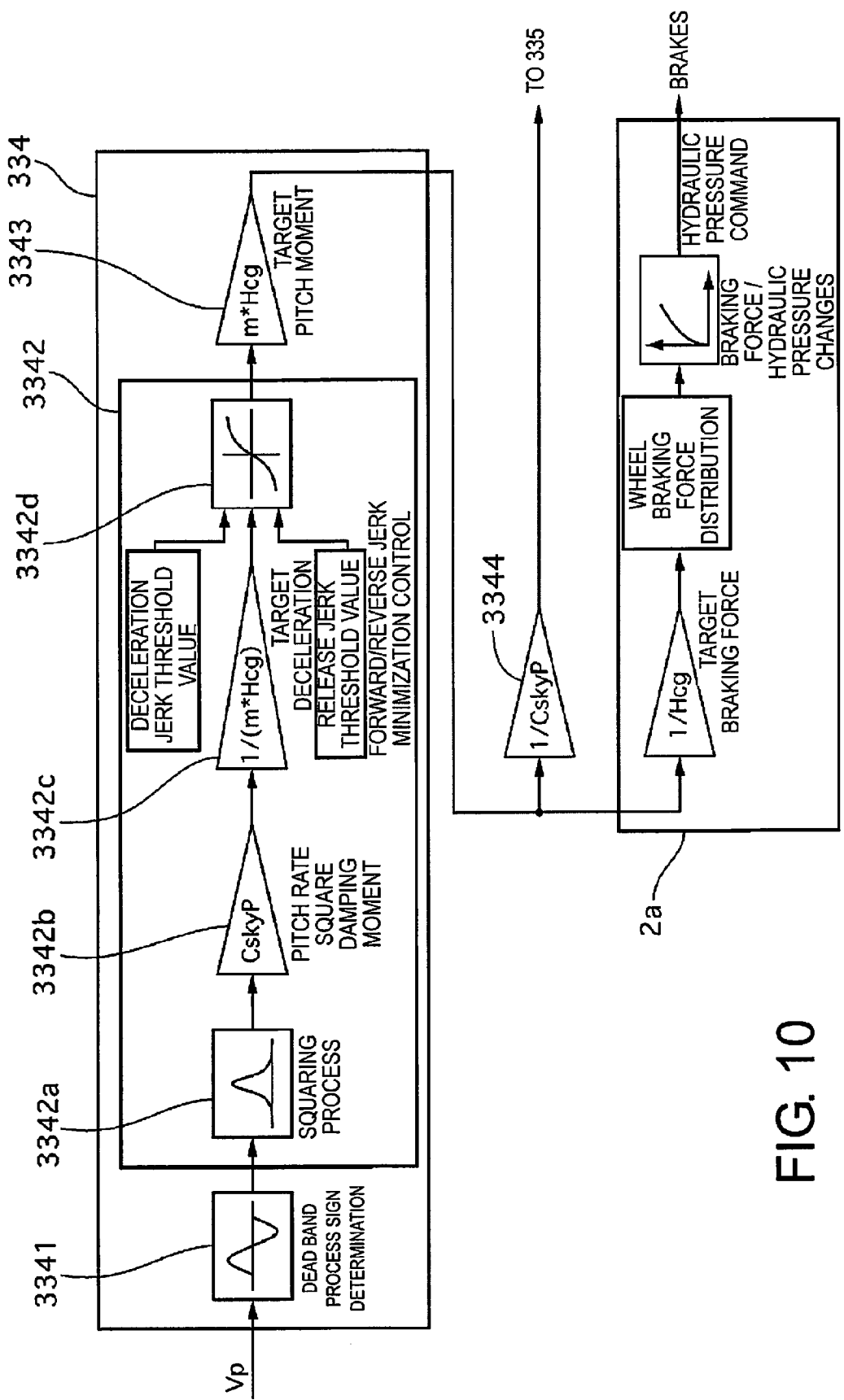
FIG. 10 is a control block diagram of brake pitch control in the first embodiment.

Brake pitch control will now be described. Generally, the brakes 20 are capable of controlling both bounce and pitch; thus, it is preferable that they control both. However, when bounce control is performed by the brakes 20, braking force is applied to all four wheels simultaneously, and there is a strong sense of deceleration even in directions of low control priority despite the difficulty in obtaining control effects, tending to create an unnatural feel for the driver. Thus, a configuration in which the brakes 20 specialize in pitch control has been adopted. FIG. 10 is a control block diagram of brake pitch control in the first embodiment. Defining m as the mass of the vehicle body, Bff as front wheel braking force, BFr as rear wheel braking force, Hcg as the height between the vehicle center of gravity and the road surface, a as vehicle acceleration, Mp as pitch moment, and Vp as pitch rate, the following relationships hold.

$$BFf + BFr = m \cdot a$$

$$m \cdot a \cdot Hcg = Mp$$

$$Mp = (BFf + BFr) \cdot Hcg$$

If braking force is applied when the pitch rate Vp is positive, i.e., the front wheel side of the vehicle is lowered, the front wheel side will sink further lower, augmenting pitch motion; thus, braking force is not applied in such cases. On the other hand, when the pitch rate Vp is negative, i.e., the front wheel side of the vehicle is raised, the braking pitch moment will impart braking force, minimizing the rising of the front wheel side. This ensures the driver's field of view and makes the area ahead easier to see, contributing to improved senses of safety and flatness of ride. In other words, the following control amounts are applied:

when Vp>0 (front wheels lowered), Mp=0; and when Vp≤0 (front wheels raised), Mp=CskyP·Vp Braking torque is thus generated only when the front side of the vehicle is raised, thereby allowing the sense of deceleration created thereby to be reduced compared to cases in which braking torque is generated both when the front side is raised and when it is lowered. In addition, the actuators need only be operated at half the frequency as usual, allowing inexpensive actuators to be used.

The brake orientation control amount calculator unit 334 comprises the following control blocks on the basis of the relationship described above. A dead band process sign determiner unit 3341 determines the sign for the inputted pitch rate Vp; if the sign is positive, no control is necessary, so 0 is outputted to a deceleration sense-reducing processor 3342, and if the sign is negative, control is determined to be possible, so a pitch rate signal is outputted to the deceleration sense-reducing processor 3342.

(Deceleration Sense Reduction Process)

Next, a deceleration sense reduction process will be described. This process corresponds to the limit applied by the limit value set in the brake orientation control amount calculator unit 334. A squaring processor 3342a squares the pitch rate signal. This reverses the sign, and smoothes the increase in control force. A pitch rate square damping moment calculator unit 3342b multiplies the squared pitch rate by a skyhook gain CskyP for the pitch term that takes the squaring process into account to calculate pitch moment Mp. A target deceleration calculator unit 3342c divides the pitch moment Mp by mass m and the Height Hcg between the vehicle center of gravity and the road surface to calculate a target deceleration.

A jerk threshold value limiter unit 3342d determines whether the rate of change in the calculated target deceleration, i.e., jerk, is within preset deceleration jerk threshold value and release jerk threshold value ranges, and whether the target deceleration is within a forward/reverse acceleration limit value range. If any of the threshold values is exceeds, the target deceleration is corrected to a value within the ranges for the jerk threshold values. If the target deceleration exceeds the limit value, it is set to within the limit value. It is thereby possible to generate deceleration so as not to create an unnatural feel for the driver.

A target pitch moment converter unit 3343 multiplies the target deceleration limited by the jerk threshold value limiter unit 3342d by the mass m and the height Hc9 to calculate a target pitch moment, which is outputted to the brake control unit 2a and a target pitch rate converter unit 3344. The target pitch rate converter unit 3344 divides the target pitch moment by the pitch term skyhook gain CskyP to convert to a target pitch rate (equivalent to a brake orientation control amount), which is outputted to a third target orientation control amount calculator unit 335.

In the first embodiment, the action of the operation switching unit 337 causes pitch control to be performed by the engine 1 alone when the absolute value of the amplitude of the pitch rate is less than the first predetermined value, by the S/As 3 only when the absolute value of the amplitude of the pitch rate is equal to or greater than the first predetermined value and less than the second predetermined value, and by the brakes 20 alone when the absolute value of the amplitude of the pitch rate is equal to or greater than the second predetermined value.

In other words, pitch control is not performed by the S/As 3 when the pitch rate is low (i.e., the absolute value of the amplitude of the pitch rate is less than the first predetermined value), thereby allowing the controllable range of the S/As 3 to be reduced, and enabling pitch control to be achieved using inexpensive S/As 3. As a rule, an increase in damping force control amount at this point would lead to increased damping force. Because increased damping force leads to stiff suspension characteristics, high-frequency input is more easily transmitted when there is high-frequency vibration input from the road surface, reducing passenger comfort (this situation is hereafter referred to as exacerbated high-frequency vibration characteristics). By contrast, not performing pitch control using the S/As 3 allows exacerbation of high-frequency vibration to be avoided when the pitch rate is low.

Pitch control is not performed by the brakes 20 when the pitch rate is middling (i.e., the absolute value of the amplitude of the pitch rate is equal to or greater than the first predetermined value and less than the second predetermined value) or low, thereby allowing an increased sense of deceleration arising from increased braking torque to be avoided when pitch rate is middling or low. Because pitch rate is rarely high (i.e., the absolute value of the amplitude of the pitch rate is equal to or greater than the second predetermined value), the number of situations in which deceleration is generated can be reduced, improving the durability of the brake system.

In addition, not performing pitch control using the S/As 3 when the pitch rate is high allows the controllable range of the S/As 3 to be reduced, allowing for pitch control using inexpensive S/As 3. Exacerbated high-frequency vibration in situations in which the pitch rate is high can also be avoided.

(Frequency-sensitive Control Unit)

Next, a frequency-sensitive control process performed in the sprung mass vibration damping control unit will be described. In the first embodiment, as a rule, the sprung mass speed is estimated on the basis of the values detected by the wheel speed sensors 5, and skyhook control is performed based thereon, thereby achieving sprung mass vibration damping control. However, there are cases in which it may not be possible to guarantee sufficient estimation precision using the wheel speed sensors 5, and cases in which it is desirable to actively guarantee a comfortable driving state (i.e., a soft ride rather than a feeling of vehicle body flatness) depending on driving conditions or the driver's intent. In such cases, it may be difficult to effect suitable control due to slight phase shifts if vector control such as skyhook control, in which the relationship (phase, etc.) of the signs of the stroke speed and the sprung mass speed is vital, is used; thus, frequency-sensitive control constituted by sprung mass vibration damping control according to vibration profile scalar quantities has been introduced.

Figure 11:
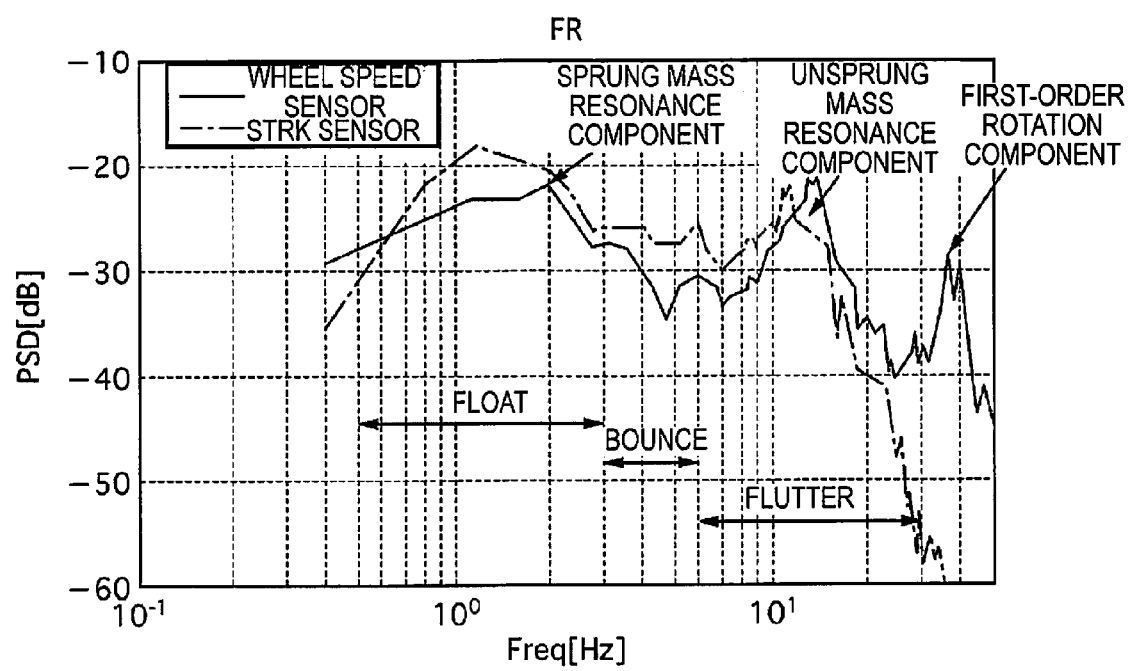
FIG. 11 is a graph simultaneously showing a wheel speed frequency profile detected by a wheel speed sensor and a stroke frequency profile from a stroke sensor not installed in the present embodiment.

FIG. 11 is a graph simultaneously showing a wheel speed frequency profile detected by a wheel speed sensor and a stroke frequency profile from a stroke sensor not installed in the present embodiment. In this context, "frequency profile" refers to a profile in which the magnitude of amplitude against frequency is plotted on the y axis. A comparison of the frequency component of the wheel speed sensor 5 and the frequency component of the stroke sensor shows that roughly similar scalar quantities can be plotted from the sprung mass resonance frequency component to the unsprung mass resonance frequency component. Thus, the damping force has been set on the basis of this frequency profile out of the values detected by the wheel speed sensor 5. The region in which the sprung mass resonance frequency component is present is a frequency region in which the swaying of a passenger's entire body creates a sensation as thought the passenger is floating in the air, that is, that the gravitational acceleration affecting the passenger has decreased, and is referred to as the float region (0.5-3 Hz). The region between the sprung mass resonance frequency component and the unsprung mass resonance frequency component is a frequency region in which, although there is no sensation of reduced gravitational acceleration, there is a sensation similar to the quick, frequent bouncing experienced by a person on horseback when riding at a trot, that is, an up-and-down motion followed by the entire body, and is referred to as the bounce region (3-6 Hz). The region in which the unsprung mass resonance frequency component is present is a frequency region in which, although vertical body mass movement is not experienced, frequent vibrations are conveyed to a part a passenger's body, such as the thighs, and is referred to as a flutter region (6-23 Hz).

Figure 12:
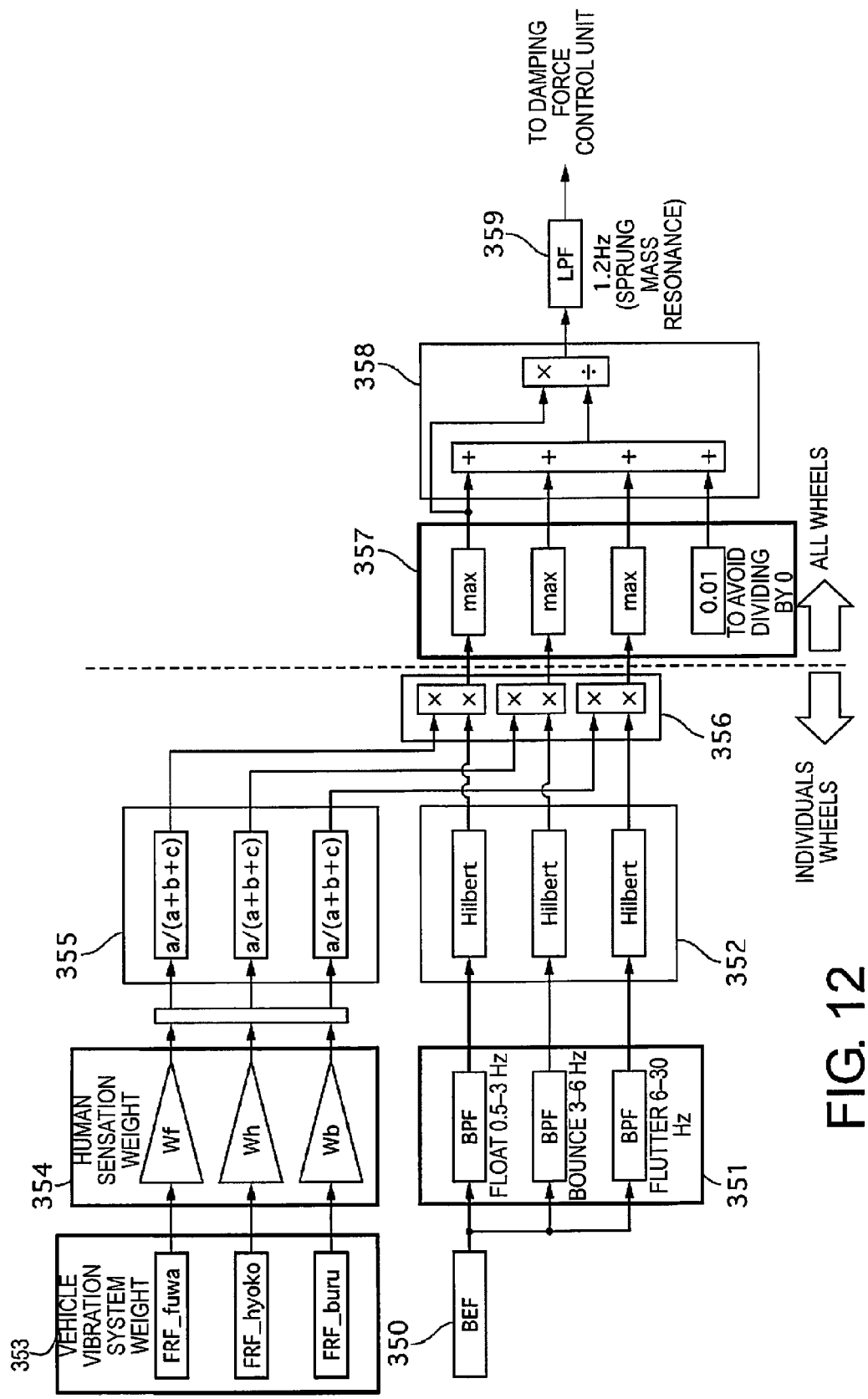
FIG. 12 is a control block diagram showing frequency-sensitive control in sprung mass vibration damping control in the first embodiment.

FIG. 12 is a control block diagram showing frequency-sensitive control in sprung mass vibration damping control in the first embodiment. A band elimination filter 350 cuts out noise apart from the frequency component in the wheel speed sensor value that is used to perform control. A predetermined frequency region splitter unit 351 splits the frequency component into a float region, a bounce region, and a flutter region. A Hilbert transform processor unit 352 performs a Hilbert transform upon the split frequency bands, converting them to scalar quantities (specifically, areas calculated using amplitude and frequency band) based on the amplitude of the frequency. A vehicle vibrational system weight-setting unit 353 sets weights for the vibration from the float region, bounce region, and flutter region frequency bands that is actually propagated to the vehicle. A human sensation weight-setting unit 354 sets weights for the vibration from the float region, bounce region, and flutter region frequency bands that is actually propagated to a passenger.

Figure 13:
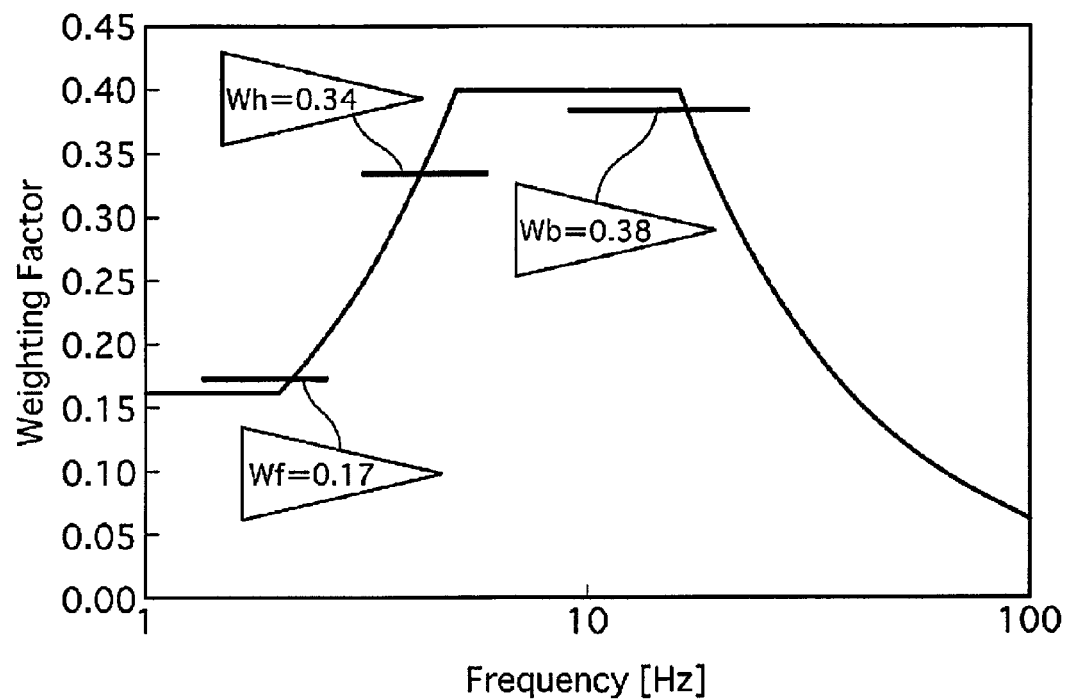
FIG. 13 is a correlation graph showing human sensation profiles in different frequency regions.

The setting of human sensation weights will now be described. FIG. 13 is a correlation graph showing human sense profiles plotted against frequency. As shown in FIG. 13, passenger sensitivity to frequencies is comparatively low in the low-frequency float region, with sensitivity gradually increasing as one moves into regions of higher frequencies. Frequencies in the flutter region and higher-frequency regions become progressively harder to transmit to the passenger. In view of this, the float region human sensation weight Wf is set at 0.17, the bounce region human sensation weight Wh is set higher than Wf at 0.34, and the flutter region human sensation weight Wb is set higher than Wf and Wh at 0.38. It is thereby possible to increase the correlation between the scalar quantities for the various frequency bands and the vibration actually propagated to a passenger. These two weighting factors may be altered, as appropriate, according to vehicle concept or passenger preferences.

A weight-determining device 355 calculates the proportions occupied by the weight for each of the frequency bands. Defining a as the float region weight, b as the bounce region weight, and c as the flutter region weight, the weighting factor for the float region is (a/(a+b+c)), the weighting factor for the bounce region is (b/(a+b+c)), and the weighting factor for the flutter region is (c/(a+b+c)). A scalar quantity calculator unit 356 multiplies the scalar quantities for the various frequency bands calculated by the Hilbert transform processor unit 352 by the device 355, and outputs final scalar quantities. The process up to this point is performed on the wheel speed sensor values for each of the wheels.

A maximum value-selecting unit 357 selects the maximum value out of the final scalar quantities calculated for each of the four wheels. The 0.01 at the bottom is set to avoid having 0 as a denominator, as the total of the maximum values is used as a denominator in a subsequent process. A proportion calculator unit 358 calculates proportions using the total of the maximum scalar quantity values for each of the frequency bands as the denominator and the maximum scalar quantity value for the frequency band equivalent to a float region as the numerator. In other words, the proportion of contamination (hereafter, simply "proportion") in the float region contained in all vibration components is calculated. A sprung mass resonance filter 359 performs a filter process having a sprung mass resonance frequency of roughly 1.2 Hz on the calculated proportion, and extracts a sprung mass resonance frequency band component representing the float region from the calculated proportion. In other words, because the float region is present at roughly 1.2 Hz, it is believed that the proportion of this region will also vary around 1.2 Hz. The finally extracted proportion is then outputted to the damping force control unit 35, and a frequency-sensitive damping force control amount corresponding to the proportion is outputted.

Figure 14:
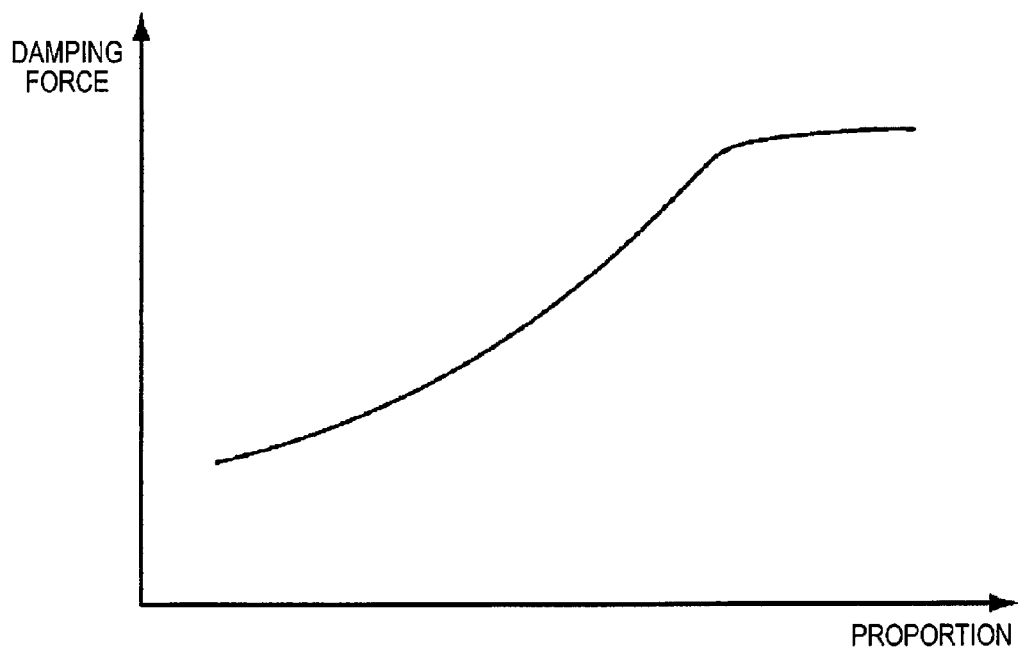
FIG. 14 is a plot showing the relationship between the proportion of vibration contamination and damping force in a float region in the frequency-sensitive control of the first embodiment.

FIG. 14 is a plot showing the relationship between the proportion of vibration contamination and damping force in a float region in the frequency-sensitive control of the first embodiment. As shown in FIG. 14, a high damping force is set when the float region occupies a large proportion, thereby reducing the vibration level of sprung mass resonance. Even if a high damping force is set, no high-frequency vibration or bounce-like vibration is transmitted to the passenger because the bounce region and flutter region occupy small proportions. Meanwhile, setting a low damping force when the float region occupies a small proportion reduces the vibration transmission profile at and above sprung mass resonance, minimizing high-frequency vibration and yielding a smooth ride.

Figure 15:
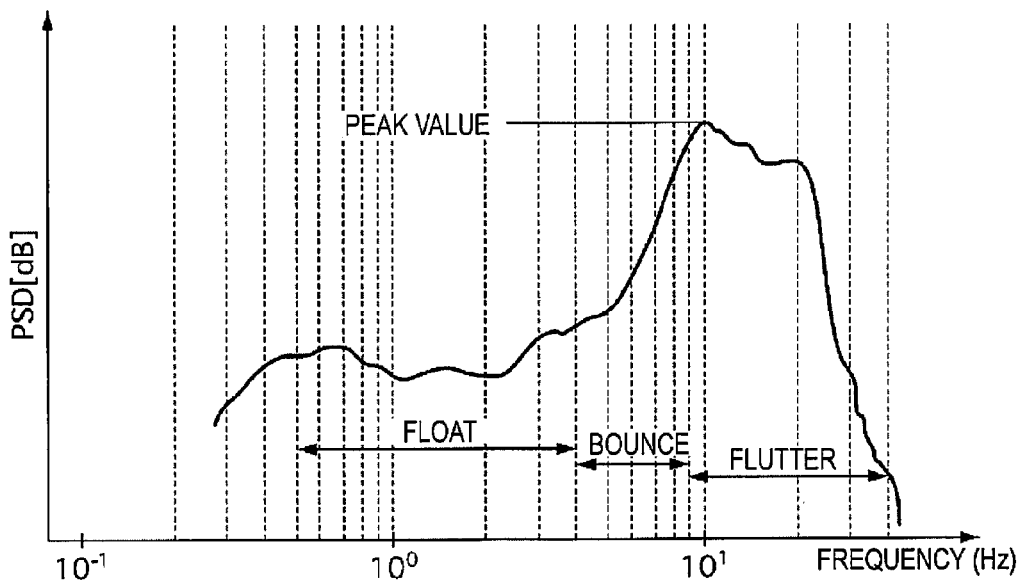
FIG. 15 is a wheel speed frequency profile detected by a wheel speed sensor in certain driving conditions.

The benefits of frequency-sensitive control in a comparison of frequency-sensitive control and skyhook control will now be described. FIG. 15 is a wheel speed frequency profile detected by a wheel speed sensor 5 in certain driving conditions. This profile especially appears when driving on road surfaces having continuous small bumps, such as cobbled roads. When skyhook control is performed while driving on a road surface exhibiting this profile, the problem arises that, because damping force is determined using the peak amplitude value in skyhook control, any degradation in phase estimation for high-frequency vibrational input will cause an extremely high damping force to be set at the wrong timing, leading to exacerbated high-frequency vibration.

By contrast, if control is performed using scalar quantities rather than vectors, as in frequency-sensitive control, the float region occupies a small proportion on road surfaces such as that shown in FIG. 15, leading to a low damping force being set. Thus, even if the amplitude of flutter region vibration is high, the vibration transmission profile is sufficiently reduced, allowing the exacerbation of high-frequency vibration to be avoided. As shown by the foregoing, high-frequency vibration can be minimized via scalar quantity-based frequency-sensitive control in regions where control is difficult due to degradations in phase estimation precision even if skyhook control is performed using an expensive sensor.

(Unsprung Mass Vibration Damping Control Unit)

Next, the configuration of the unsprung mass vibration damping control unit will be described. As discussed in the context of the conventional vehicle shown in FIG. 8B, a resonance frequency band is also present in tires, as they possess both a modulus of elasticity and a damping coefficient. However, because a tire has a mass that is less than that of the sprung mass, and a high modulus of elasticity as well, the band is present toward frequencies higher than sprung mass resonance. The unsprung mass resonance component causes tire rumbling in the unsprung mass, potentially degrading ground contact. In addition, rumbling in the unsprung mass can be uncomfortable for passengers. Thus, damping force is set according to the unsprung mass resonance component in order to minimize unsprung mass resonance-induced rumbling.

Figure 16:
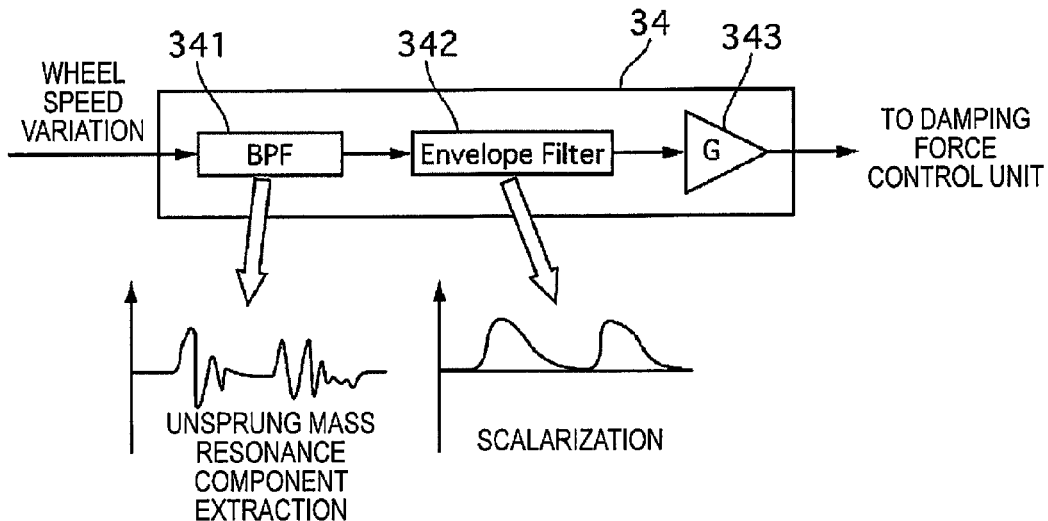
FIG. 16 is a block diagram showing a control configuration for unsprung mass vibration damping control in the first embodiment.

FIG. 16 is a block diagram showing a control configuration for unsprung mass vibration damping control in the first embodiment. An unsprung mass resonance component extractor unit 341 applies a band-pass filter to the wheel speed variation outputted from the deviation calculator unit 321b of the driving state estimator unit 32 to extract an unsprung mass resonance component. The unsprung mass resonance component is extracted from the region at roughly 10-20 Hz in the wheel speed frequency component. An envelope waveform-forming unit 342 scalarizes the extracted unsprung mass resonance component, and forms an envelope waveform using an envelope filter. A gain multiplier unit 343 multiplies the scalarized unsprung mass resonance component by the gain, calculates an unsprung mass vibration damping force control amount, which is outputted to the damping force control unit 35. In the first embodiment, an unsprung mass resonance component is extracted by applying a band-pass filter to the wheel speed variation outputted from the deviation calculator unit 321b of the driving state estimator unit 32, but it is also acceptable to apply a band-pass filter to the value detected by the wheel speed sensor to extract the unsprung mass resonance component, or for the driving state estimator unit 32 to estimate the unsprung mass speed along with the sprung mass speed to extract an unsprung mass resonance component.

(Configuration of Damping Force Control Unit)

Figure 17:
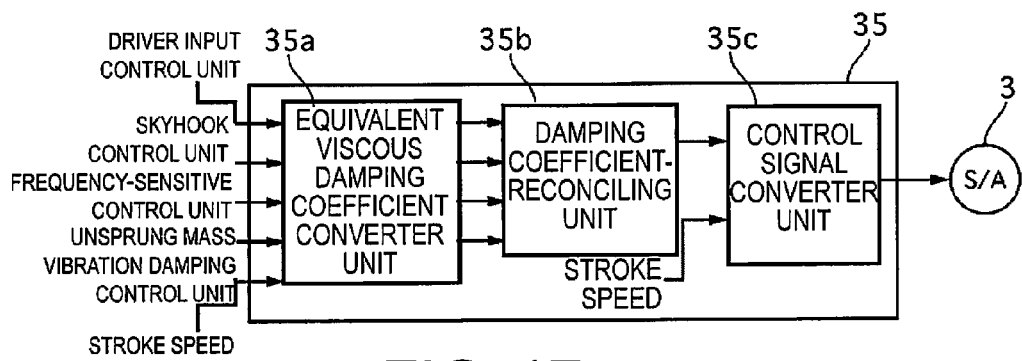
FIG. 17 is a control block diagram showing a control configuration for a damping force control unit of the first embodiment.

Next, the configuration of the damping force control unit 35 will be described. FIG. 17 is a control block diagram showing a control configuration for a damping force control unit of the first embodiment. The driver input damping force control amount outputted from the driver input control unit 31, the S/A orientation control amount outputted from the skyhook control unit 33a, the frequency-sensitive damping force control amount outputted from the frequency-sensitive control unit 33b, the unsprung mass vibration damping force control amount outputted from the unsprung mass vibration damping control unit 34, and the stroke speed calculated by the driving state estimator unit 32 are inputted into an equivalent viscous damping coefficient converter unit 35a, which converts these values into an equivalent viscous damping coefficient.

A damping coefficient-reconciling unit 35b reconciles which damping coefficient, out of the damping coefficients converted by the equivalent viscous damping coefficient converter unit 35a (hereafter referred to individually as the driver input damping coefficient k1, the S/A orientation damping coefficient k2, the frequency-sensitive damping coefficient k3, and the unsprung mass vibration damping coefficient k4), is used to perform control, and outputs a final damping coefficient. A control signal converter unit 35c converts a control signal (commanded current value) to be sent to the S/As 3 on the basis of the damping coefficient reconciled by the damping coefficient-reconciling unit 35b and the stroke speed, and outputs the signal to the S/As 3.

(Damping Coefficient-reconciling Unit)

Next, the specifics of the reconciliation performed by the damping coefficient-reconciling unit 35b will be described. The vehicle control device of the first embodiment has four control modes. The first mode is standard mode, for situations in which suitable steering conditions are obtainable while driving on general urban roads. The second mode is sports mode, for situations in which stable steering conditions are available while aggressively driving along winding roads and the like. The third mode is comfort mode, for situations in which priority is given to comfort while driving, such as when starting off at low vehicle speeds. The fourth mode is highway mode, for situations involving driving at high vehicle speeds on highways and the like with multiple straight sections.

In standard mode, priority is given to unsprung mass vibration damping control performed by the unsprung mass vibration damping control unit 34 while skyhook control is being performed by the skyhook control unit 33a. In sports mode, skyhook control is performed by the skyhook control unit 33a and unsprung mass vibration damping control is performed by the unsprung mass vibration damping control unit 34 while giving priority to driver input control performed by the driver input control unit 31. In comfort mode, priority is given to unsprung mass vibration damping control performed by the unsprung mass vibration damping control unit 34 while frequency-sensitive control is being performed by the frequency-sensitive control unit 33b. In highway mode, the control amount for the unsprung mass vibration damping control performed by the unsprung mass vibration damping control unit 34 is added to the skyhook control performed by the skyhook control unit 33a while given priority to the driver input control performed by the driver input control unit 31. Damping coefficient reconciliation in these various modes will now be described.

(Reconciliation in Standard Mode)

Figure 18:
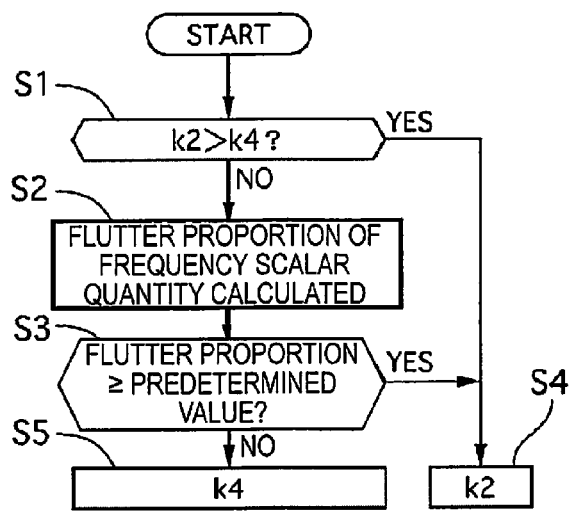
FIG. 18 is a flow chart of a damping coefficient reconciliation process performed during a standard mode in the first embodiment.

FIG. 18 is a flow chart of a damping coefficient reconciliation process performed during a standard mode in the first embodiment.

In step S1, it is determined whether the S/A orientation damping coefficient k2 is greater than the unsprung mass vibration damping coefficient k4, and, if so, the process continues to step S4, and k2 is set as the damping coefficient.

In step S2, the scalar quantity proportion of the flutter region is calculated on the basis of the scalar quantities for the float region, bounce region, and flutter region described in the context of the frequency-sensitive control unit 33b.

In step S3, it is determined whether the proportion of the flutter region is equal to or greater than a predetermined value, and, if so, the process continues to step S4 and the low value k2 is set as the damping coefficient for fear of high-frequency vibration reducing ride comfort. On the other hand, if the proportion of the flutter region is less than the predetermined value, there is no worry of high-frequency vibration reducing ride comfort even if a high damping coefficient is set, so the process continues to step S5, and k4 is set as the coefficient.

In standard mode, as discussed above, priority is given, as a rule, to unsprung mass vibration damping control, which minimizes resonance in the unsprung mass. However, if the damping force required for skyhook control is less than the damping force required for unsprung mass vibration damping control, and the flutter region occupies a large proportion, the damping force for skyhook control is set so as to avoid exacerbating the high-frequency vibration profile in order to meet the requirements of unsprung mass vibration damping control. This allows an optimal damping profile to be obtained according to the driving state, allowing high-frequency vibration-induced degradations of ride comfort to be avoided while simultaneously achieving a flat vehicle body feel.

(Reconciliation in Sports Mode)

Figure 19:
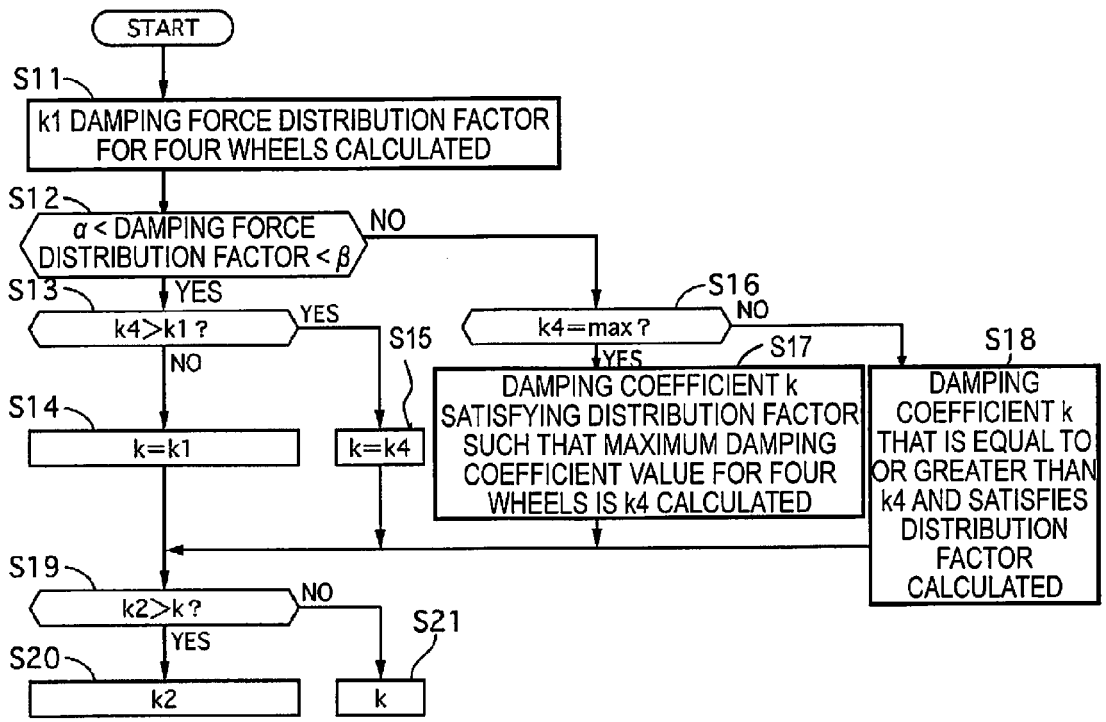
FIG. 19 is a flow chart of a damping coefficient reconciliation process performed during a sports mode in the first embodiment.

FIG. 19 is a flow chart of a damping coefficient reconciliation process performed during a sports mode in the first embodiment.

In step S11, the damping force distribution factors for the four wheels are calculated on the basis of the driver input damping coefficients k1 for the four wheels set during driver input control. Defining k1fr as the front right wheel driver input damping coefficient, k1fl as the front left wheel driver input damping coefficient, k1rr as the rear right wheel driver input damping coefficient, k1rl as the rear left wheel driver input damping coefficient, and xfr, xfl, xrr, and xrl as the damping force distribution factors for the different wheels, the distribution factors are calculated as follows:

$$xfr = k1fr/(k1fr+k1fl+k1rr+k1rl)$$

$$xfl = k1fl/(k1fr+k1fl+k1rr+k1rl)$$

$$xrr = k1rr(k1fr+k1fl+k1rr+k1rl)$$

$$xrl = k1rl/(k1fr+k1fl+k1rr+k1rl)$$

In step S12, it is determined whether a damping force distribution factor x is within a predetermined range (greater than $\alpha$ and less than $\beta$), and, if so, distribution is determined to be roughly equal for all the wheels, and the process continues to step S13; if even one factor is outside the predetermined range, the process continues to step S16.

In step S13, it is determined whether the unsprung mass vibration damping coefficient k4 is greater than the driver input damping coefficient k1, and, if so, the process continues to step S15, and k4 is set as a first damping coefficient k. On the other hand, if the unsprung mass vibration damping coefficient k4 is equal to or less than the driver input damping coefficient k1, the process continues to step S14, and k1 is set as the first damping coefficient k.

In step S16, it is determined whether the unsprung mass vibration damping coefficient k4 is the maximum value max that can be set for the S/As 3; if so, the process continues to step S17, and, if not, the process continues to step S18.

In step S17, the maximum value for the driver input damping coefficients k1 for the four wheels is the unsprung mass vibration damping coefficient k4, and the damping coefficient that satisfies the damping force distribution factor is calculated as the first damping coefficient k. In other words, a value is calculated such that the damping coefficient is maximized while the damping force distribution factor is satisfied.

In step S18, a damping coefficient such that the damping force distribution factor is satisfied within a range in which the driver input damping coefficients k1 for all four wheels are equal to or greater than k4. In other words, a value is calculated such that the damping force distribution factor set by the driver input control is satisfied, and the requirements of unsprung mass vibration damping control are also met.

In step S19, it is determined whether the first damping coefficients k set in the abovementioned steps are less than the S/A orientation damping coefficient k2 set during skyhook control; if so, k2 is set and the process continues to step S20 due to the damping coefficient required by skyhook control being larger. On the other hand, if k is equal to or greater than k2, k is set and the process continues to step S21.

In sports mode, as discussed above, priority is given, as a rule, to unsprung mass vibration damping control, which minimizes resonance in the unsprung mass. However, because the damping force distribution factor required by driver input control is closely related to the vehicle body orientation, and is particularly deeply related to changes in driver line of view caused by roll mode, foremost priority is given to ensuring the damping force distribution factor, rather than the damping coefficient required by driver input control itself. For movement that causes changes in vehicle body orientation while preserving the damping force distribution factor, selecting skyhook control via select high allows a stable vehicle body orientation to be maintained.

(Reconciliation in Comfort Mode)

Figure 20:
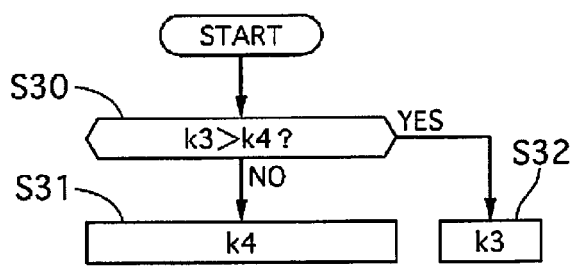
FIG. 20 is a flow chart of a damping coefficient reconciliation process performed during a comfort mode in the first embodiment.

FIG. 20 is a flow chart of a damping coefficient reconciliation process performed during a comfort mode in the first embodiment.

In step S30, it is determined whether the frequency-sensitive damping coefficient k3 is greater than the unsprung mass vibration damping coefficient k4, and, if so, the process continues to step S32 and the frequency-sensitive damping coefficient k3 is set. On the other hand, if the frequency-sensitive damping coefficient k3 is determined to be equal to or less than the unsprung mass vibration damping coefficient k4, the process continues to step S32 and the unsprung mass vibration damping coefficient k4 is set.

In comfort mode, as discussed above, priority is given, as a rule, to unsprung mass resonance damping control, which minimizes resonance in the unsprung mass. Because frequency-sensitive control is performed as sprung mass vibration damping control to begin with, and an optimal damping coefficient for the road surface conditions is set, control can be performed while ensuring ride comfort, allowing sensations insufficient ground contact caused by rattling in the unsprung mass to be avoided through unsprung mass vibration damping control. In comfort mode, as in standard mode, it is acceptable for the damping coefficient to be switched according to the proportion of flutter in the frequency scalar quantity. This allows for a super comfort mode in which ride comfort is even better ensured.

(Reconciliation in Highway Mode)

Figure 21:
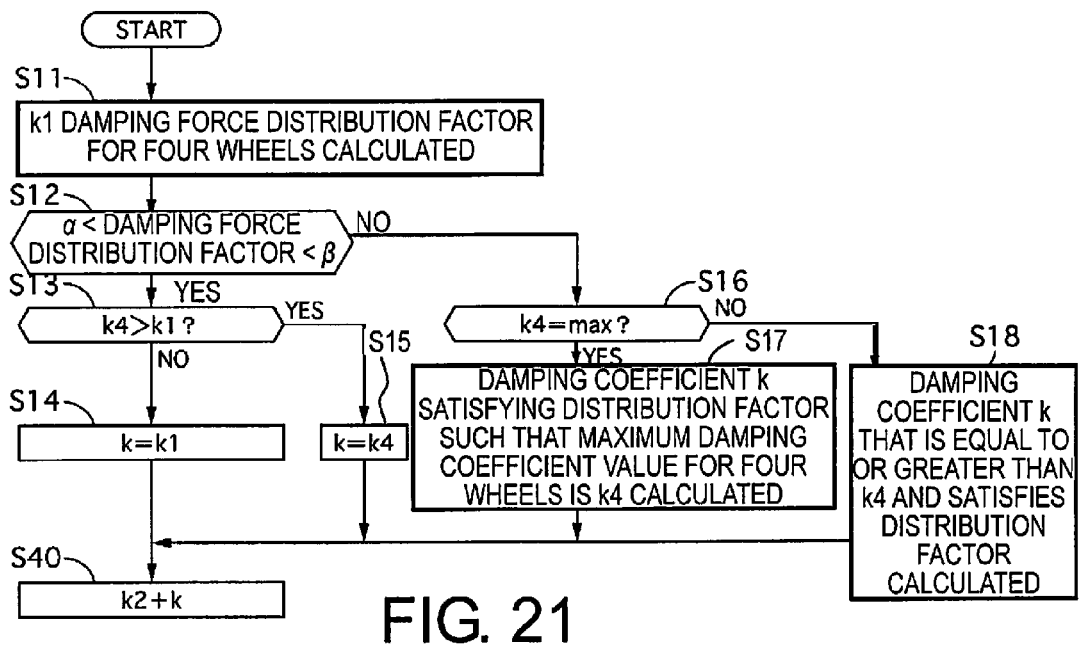
FIG. 21 is a flow chart of a damping coefficient reconciliation process performed during a highway mode in the first embodiment.

FIG. 21 is a flow chart of a damping coefficient reconciliation process performed during a highway mode in the first embodiment. The same reconciliation process as in sports mode is performed from steps S11 to S18; thus, description thereof will be omitted. In step S40, the S/A orientation damping coefficient k2 yielded by skyhook control is added to the reconciled first damping coefficient k yielded by the process up to step S18 and outputted.

Figure 22:
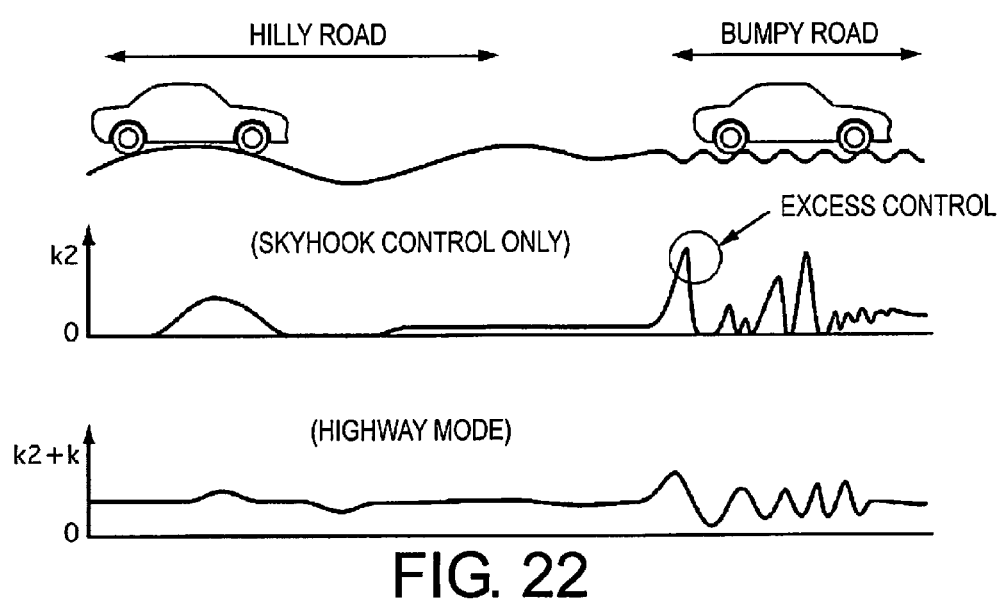
FIG. 22 is a time chart showing changes in damping coefficient when driving on a hilly road surface and a bumpy road surface.

In highway mode, as discussed above, the sum of the reconciled first damping coefficient k and the S/A orientation damping coefficient k2 is used to reconcile the damping coefficient. This operation will now be described with reference to the drawings. FIG. 22 is a time chart showing changes in damping coefficient when driving on a hilly road surface and a bumpy road surface. For instance, if an attempt is made to minimize swaying motion in the vehicle body caused by the effects of slight hills in the road surface when driving at high vehicle speeds via skyhook control alone, it is necessary to detect slight variations in wheel speed, which requires that a comparatively high skyhook control gain be set. In such cases, swaying motion can be minimized, but bumps in the road surface can lead to the control gain being too great, creating the risk of excessive damping force control being performed. This gives rise to concerns of degraded ride comfort or vehicle body orientation.

By contrast, because the first damping coefficient k is constantly set, as in highway mode, a certain level of damping force can be constantly ensured, allowing swaying motion in the vehicle body to be minimized even if a low damping coefficient is used in skyhook control. In addition, because there is no need to increase the skyhook control gain, bumps in the road surface can be managed using a normal control gain. Moreover, because skyhook control is performed in a state in which the damping coefficient k is set, a process of reducing the damping coefficient can be operated in a semi-active control region, unlike in the case of a damping coefficient limit, ensuring a stable vehicle orientation during high-speed driving.

(Mode Selection Process)

Figure 23:
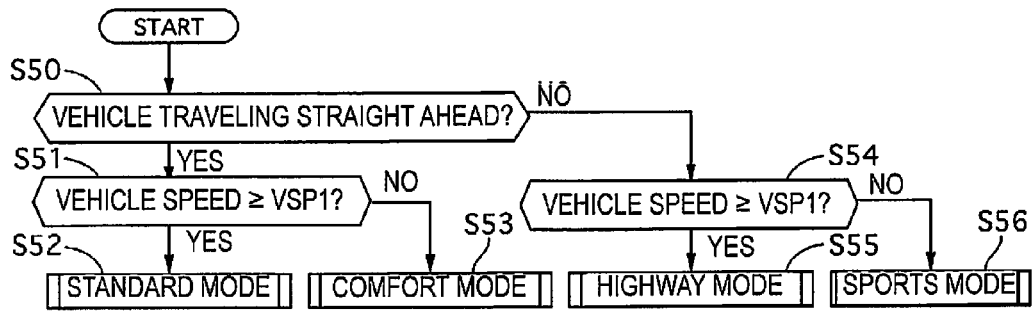
FIG. 23 is a flow chart of a driving state-based mode selection process performed by a damping coefficient-reconciling unit of the first embodiment.

Next, a mode selection process for selecting among the various driving modes described above will be described. FIG. 23 is a flow chart of a driving state-based mode selection process performed by a damping coefficient-reconciling unit of the first embodiment.

In step S50, it is determined whether the vehicle is driving straight ahead based on the value from the steering angle sensor 7; if so, the process continues to step S51, and if the vehicle is determined to be in a state of turning, the process continues to step S54.

In step S51, it is determined whether the vehicle speed is equal to or greater than a predetermined vehicle speed VSP1 indicating a state of high vehicle speed on the basis of the value from the vehicle speed sensor 8, and, if so, the process continues to step S52 and standard mode is selected. On the other hand, if the speed is less than VSP1, the process continues to step S53 and comfort mode is selected.

In step S54, it is determined whether the vehicle speed is equal to or greater than a predetermined vehicle speed VSP1 indicating a state of high vehicle speed on the basis of the value from the vehicle speed sensor 8, and, if so, the process continues to step S55 and highway mode is selected. On the other hand, if the speed is less than VSP1, the process continues to step S56 and sports mode is selected.

That is, standard mode is selected when driving at a high vehicle speed when driving straight ahead, thereby making it possible to stabilize the vehicle body orientation via skyhook control, ensure ride comfort by minimizing high-frequency vibration-induced bouncing or fluttering, and minimizing resonance in the unsprung mass. Selecting comfort mode when driving at low speeds makes it possible to minimize resonance in the unsprung mass while minimizing the transmission of vibration such as bouncing or fluttering to passengers.

Meanwhile, highway mode is selected when driving at a high vehicle speed in a state of turning, thereby performing control using a value to which a damping coefficient has been added; thus, high damping force is yielded as a rule. It is thus possible to minimize unsprung mass resonance while actively ensuring the unsprung mass resonance during turning via driver input control, even when traveling at a high vehicle speed. Selecting sports mode when driving at a low vehicle speed allows unsprung mass resonance to be minimized while actively ensuring the vehicle body orientation during turning via driver input control and performing skyhook control as appropriate, thereby allowing for driving with a stable vehicle orientation.

In the first embodiment, an example of a mode selection process in Which the driving state is detected and the mode is automatically switched has been presented, but it is also possible to provide a mode switch or the like that can be operated by a driver to select the driving mode. This yields ride comfort and turning performance matching the driver's desired driving state.

As described above, the first embodiment yields the following effects.

(1) Provided are an engine orientation control amount calculator unit 332 (a motive power source orientation control device) for calculating an engine orientation control amount for an engine 1 of a vehicle serving as a first orientation control device for obtaining a target orientation for vehicle body orientation and outputting the amount to the engine 1, a second orientation control device for calculating a second orientation control amount for a second orientation control device for obtaining a target orientation for the vehicle body orientation and outputting the amount to the second orientation control device, a driving state estimator unit 32 (a state quantity detection device) for detecting a state quantity indicating vehicle body orientation, and a skyhook control unit 33a (an orientation control device) for controlling vehicle body orientation using the engine orientation control amount calculator unit 332 when the absolute value of the amplitude of a detected state quantity is less than a second predetermined value, and controlling vehicle body orientation using the second orientation control device instead of the engine orientation control amount calculator unit 332 when the absolute value of the amplitude is equal to or greater than the second predetermined value.

As a result, vehicle body orientation is not controlled using drive force from the engine 1 when amplitude is high, allowing variations in drive force to be minimized and the level of unnatural feel experienced by a driver to be reduced.

(2) The second orientation control device is the brakes 20, and the second orientation control device is a brake orientation control amount calculator unit 334 (a friction brake orientation control device) for calculating the brake orientation control amount for the brakes 20 as a second orientation control amount and outputting this amount to the brakes 20.

It is thereby possible to control orientation using the engine 1 and the brakes 20, which are actuators that are completely unrelated to the exacerbation of high-frequency vibration characteristics, allowing such exacerbation to be avoided. In other words, it is possible to control orientation using the engine 1 and the brakes 20, which are actuators that are completely unrelated to the exacerbation of high-frequency vibration characteristics, allowing such exacerbation to be avoided. In addition, because orientation is controlled using only the engine orientation control amount for the engine 1 and the brake orientation control amount for the brakes 20 is set to zero when the absolute value of the amplitude of the state quantity representing vehicle body orientation is less than the second predetermined value, the number of situations in which deceleration is generated during vehicle body orientation control can be reduced, improving the durability of the brake system.

(3) Provided is a S/A orientation control amount calculator unit 336 (a damping force control device) for calculating a shock absorber orientation control amount for the S/As 3 serving as a third orientation control device in order that will yield a target orientation for the vehicle body orientation and outputting the amount to the S/As 3. The skyhook control unit 33a (an orientation control device) controls vehicle body orientation using the engine orientation control amount calculator unit 332 when the absolute value of the amplitude of the detected state quantity is less than a first predetermined value, using the S/A orientation control amount calculator unit 336 instead of the engine orientation control amount calculator unit 332 when the absolute value of the amplitude is equal to or greater than the first predetermined value and less than a second predetermined value that is greater than the first predetermined value, and using the brake orientation control amount calculator unit 334 instead of the S/A orientation control amount calculator unit 336 when the absolute value of the amplitude is equal to or greater than the second predetermined value.

As a result, the shock absorber orientation control amount for the S/As 3 is zero when the absolute value of the amplitude of the state quantity representing vehicle body orientation is less than the first predetermined value or equal to or greater than the second predetermined value, enabling the controllable range of the S/As 3 to be reduced, and allowing vehicle body orientation to be controlled using an inexpensive arrangement. In addition, pitch control is performed by the S/As 3 in a narrow amplitude region, allowing the exacerbation of high-frequency vibration profiles to be avoided. In addition, vehicle body orientation is not performed by the brakes 20 when the absolute value of the amplitude of the state quantity indicating vehicle body orientation is less than the second predetermined value, allowing the number of situations in which deceleration is generated to be reduced, and improving the durability of the brake system.

(4) The second orientation control device is the S/As 3, and the second orientation control device is the S/A orientation control amount calculator unit 336 (a damping force control device) for calculating a shock absorber orientation control amount for the S/As 3 as a second orientation control amount, and outputting the amount to the S/As 3.

As a result, the shock absorber orientation control amount for the S/As 3 is zero when the absolute value of the amplitude of the state quantity representing vehicle body orientation is less than the first predetermined value, enabling the controllable range of the S/As 3 to be reduced, and allowing vehicle body orientation to be controlled using an inexpensive arrangement.

(5) Provided is a brake orientation control amount calculator unit 334 (a friction brake orientation control device) for calculating a brake orientation control amount for the brakes 20 serving as a third orientation control device in order that will yield a target orientation for vehicle body orientation and outputting the amount to the brakes 20. The skyhook control unit 33a (an orientation control device) controls vehicle body orientation using the engine orientation control amount calculator unit 332 when the absolute value of the amplitude of the detected state quantity is less than a first predetermined value, using the S/A orientation control amount calculator unit 336 instead of the engine orientation control amount calculator unit 332 when the absolute value of the amplitude is equal to or greater than the first predetermined value and less than a second predetermined value that is greater than the first predetermined value, and using the brake orientation control amount calculator unit 334 instead of the S/A orientation control amount calculator unit 336 when the absolute value of the amplitude is equal to or greater than the second predetermined value.

As a result, the shock absorber orientation control amount for the S/As 3 is zero when the absolute value of the amplitude of the state quantity representing vehicle body orientation is less than the first predetermined value or equal to or greater than the second predetermined value, enabling the controllable range of the S/As 3 to be reduced, and allowing vehicle body orientation to be controlled using an inexpensive arrangement. In addition, pitch control is performed by the S/As 3 in a narrow amplitude region, allowing the exacerbation of high-frequency vibration profiles to be avoided. In addition, vehicle body orientation is not performed by the brakes 20 when the absolute value of the amplitude of the state quantity indicating vehicle body orientation is less than the second predetermined value, allowing the number of situations in which deceleration is generated to be reduced, and improving the durability of the brake system.

(6) A driving state estimator unit 32 (a driving state detection device) for detecting the pitch rate of the vehicle is comprised, and the brake orientation control amount calculator unit 334 calculates the brake orientation control amount on the basis of the detected pitch rate.

Generally, the brakes 20 are capable of controlling both bounce and pitch; thus, it is preferable that they control both. However, when bounce control is performed by the brakes 20, braking force is applied to all four wheels simultaneously, and there is a strong sense of deceleration even in directions of low control priority despite the difficulty in obtaining control effects, tending to create an unnatural feed for the driver. Thus, a configuration in which the brakes 20 specialize in pitch control has been adopted.

If braking force is applied when the pitch rate Vp is positive, i.e., the front wheel side of the vehicle is lowered, the front wheel side will sink further lower, augmenting pitch motion; thus, braking force is not applied in such cases. On the other hand, when the pitch rate Vp is negative, i.e., the front wheel side of the vehicle is raised, the braking pitch moment will impart braking force, minimizing the rising of the front wheel side. This ensures the driver's field of view and makes the area ahead easier to see, contributing to improved senses of safety and flatness of ride. Because braking torque is generated only when the front side of the vehicle body is raised, the amount of deceleration generated can be reduced compared to arrangements in which braking torque is generated both when the front side is raised and when it is lowered. In addition, the actuators need only be operated at half the frequency as usual, allowing inexpensive actuators to be used.

(7) The driving state estimator unit 32 (a driving state detection device) estimates the pitch rate of the vehicle on the basis of changes in wheel speed.

The pitch rate is thus estimated using the wheel speed sensors 5 with which all vehicles are generally equipped, without the need for expensive sensors such as a sprung weight vertical acceleration sensor or a stroke sensor, thereby allowing costs and the number of parts to be reduced, and the ease with which components are installed in the vehicle to be improved.

(8) The driving state estimator unit 32 (a driving state detection device) estimates vehicle pitch rate using a four-wheel model constructed using a bounce term representing the four-wheel vertical movement, a pitch term representing front and rear wheel vertical movement, a roll term representing left and right wheel vertical movement, and a warp term representing diagonal wheel vertical movement.

In other words, one corresponding component is lacking when the sprung mass speed for all four wheels is divided into roll term, pitch term, and bounce term modes, destabilizing the solution. Thus, the warp term representing the movement of diagonal wheels is introduced in order to allow the above-mentioned terms to be estimated.

(9) The engine orientation control amount calculator unit 332 (a motive power source orientation control device), brake orientation control amount calculator unit 334 (a friction brake orientation control device), and S/A orientation control amount calculator unit 336 (a damping force control device) calculate the various orientation control amounts on the basis of skyhook control.

That is, applying skyhook control-based control amounts to the engine 1, brakes 20, and S/As 3 allows a stable sprung mass orientation to be obtained.

(10) The driving state estimator unit 32 (a state quantity detection device) estimates vehicle pitch rate. As a result, the engine orientation control amount is set to zero when the pitch rate is high, allowing variations in drive force to be minimized, and reducing the level of unnatural feel experienced by the driver. In addition, the pitch orientation control amount of the S/As 3 is set to zero when the pitch rate is low, allowing the roll orientation control amount and bounce orientation control amount to be increased all the more, and improving ease of skyhook control.

(11) Provided are a driving state estimator unit 32 (sensor) for detecting a state quantity indicating vehicle body orientation, and a skyhook control unit 33a (controller) for controlling vehicle body orientation using drive force from the engine 1 when the absolute value of the amplitude of the detected state quantity is less than the second predetermined value, and using force generated by the second orientation control device instead of the drive force from the engine 1 when the absolute value of the amplitude is equal to or greater than the second predetermined value.

As a result, vehicle body orientation is not controlled using drive force from the engine 1 when amplitude is high, allowing variations in drive force to be minimized and the level of unnatural feel experienced by a driver to be reduced.

(12) The skyhook control unit 33a controls vehicle body orientation using drive force from the engine 1 when the absolute value of the amplitude of the state quantity representing vehicle body orientation is less than the second predetermined value, and using force generated by the second orientation control device instead of the engine 1 when the absolute value of the amplitude is equal to or greater than the second predetermined value.

As a result, vehicle body orientation is not controlled using drive force from the engine 1 when amplitude is high, allowing variations in drive force to be minimized and the level of unnatural feel experienced by a driver to be reduced.

(Second Embodiment)

Figure 24:
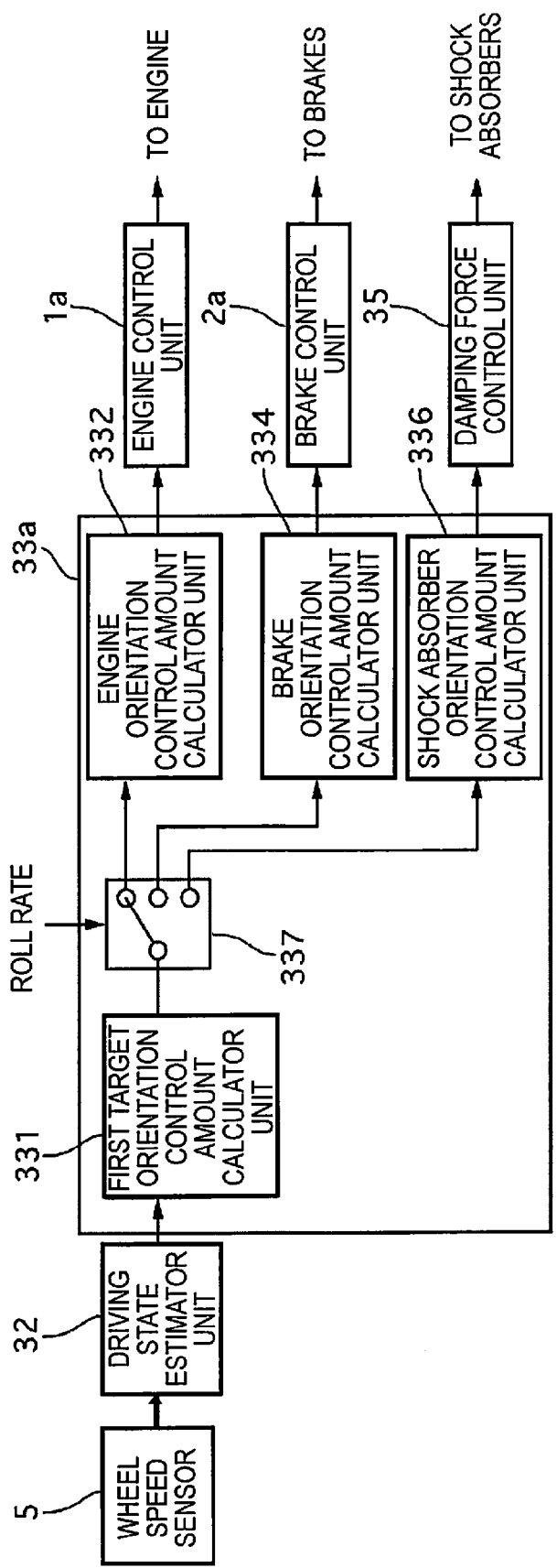
FIG. 24 is a control block diagram of actuator control amount calculation processes performed during pitch control in a second embodiment.

FIG. 24 is a control block diagram of actuator control amount calculation processes performed during pitch control in a second embodiment. The second embodiment differs from the first embodiment in that the operation switching unit 337 switches the operation of the actuators on and off on the basis of the roll rate instead of the pitch rate.

In the second embodiment, the action of the operation switching unit 337 causes pitch control to be performed using the engine torque control amount alone when the absolute value of the amplitude of the roll rate is less than a first predetermined value, using the damping force control amount instead of the engine torque control amount when the absolute value of the amplitude of the roll rate is equal to or greater than the first predetermined value and less than the second predetermined value, and using the braking torque control amount instead of the damping force control amount when the absolute value of the amplitude of the roll rate is equal to or greater than the second predetermined value.

Thus, the second embodiment yields the following effect in addition to the effects (1)-(9), (11), and (12) yielded by the first embodiment.

(13) The driving state estimator unit 32 (a state quantity detection device) is a device for detecting the roll rate of the vehicle.

As a result, the engine orientation control amount is set to zero when the roll rate is high, allowing variations in drive force to be minimized, and reducing the level of unnatural feel experienced by the driver. In addition, the brake orientation control amount is minimized when the roll rate is high or low, allowing the roll orientation control amount of the S/As 3 to be increased all the more, and allowing rolling motion to be minimized at an early stage.

(Other Embodiments)

The foregoing has been a description of embodiments of the present invention with reference to the drawings, but the specific configuration of the present invention is not limited to these embodiments.

For example, a configuration in which a motive force orientation control device, a damping force control device, and a friction brake orientation control device individually calculate control amounts that will adjust the orientation of the vehicle body to a target orientation and control the engine, brakes, and variable-damping-force shock absorbers, wherein the operation of the actuators is switched on and off according to the absolute value of the amplitude of a detected state quantity.

The invention claimed is:

1. A vehicle control device comprising:
a motive power source orientation control device configured to calculate a motive power source orientation control amount for a vehicle motive power source so as to yield a target orientation for vehicle body orientation, and configured to output the amount to the motive power source;
damping force control device configured to calculate a shock absorber orientation control amount for a variable-damping-force shock absorber so as to change the orientation of the vehicle body to the target orientation, and configured to output the shock absorber orientation control amount to the variable-damping-force shock absorber;
state quantity detection device configured to detect a state quantity indicating vehicle body orientation; and
orientation control device configured to control vehicle body orientation via the motive power source orientation control device when the absolute value of the amplitude of the detected state quantity is less than a first predetermined value, via the damping force control device instead of the motive power source orientation control device when the absolute value of the amplitude is equal to or greater than the first predetermined value and less than a second predetermined value greater than the first predetermined value, and via the friction brake orientation control device instead of the damping force control device when the absolute value of the amplitude is equal to or greater than the second predetermined value.

2. The vehicle control device according to claim 1, further comprising
a state detection device configured to detect vehicle pitch rate; and
the friction brake orientation control device is configured to calculate the brake orientation control amount on the basis of the detected pitch rate.

3. The vehicle control device according to claim 2, wherein the driving state detection device is configured to estimate vehicle pitch rate on the basis of changes in wheel speed.

4. The vehicle control device according to claim 3, wherein the driving state detection device is vehicle pitch rate via a four-wheel model constructed on the basis of a bounce term representing the four-wheel vertical movement, a pitch term representing front and rear wheel vertical movement, a roll term representing left and right wheel vertical movement, and a warp term representing diagonal wheel vertical movement.

5. The vehicle control device according to claim 4, wherein the orientation control device is configured to calculate each of the orientation control amounts on the basis of skyhook control.

6. The vehicle control device according to claim 1, wherein the orientation control device is configured to calculate each of the orientation control amounts on the basis of skyhook control.

7. The vehicle control device according to claim 6, wherein the state quantity detection device is configured to detect vehicle pitch rate.

8. The vehicle control device according to claim 1, wherein the state quantity detection device is configured to detect vehicle pitch rate.

9. The vehicle control device according to claim 1, wherein the state quantity detection device is configured to detect vehicle roll rate.

10. The vehicle control device according to claim 1, wherein the state quantity detection device is configured to detect vehicle roll rate.

11. A vehicle control device comprising:
a sensor configured to detect a state quantity indicating vehicle body orientation; and
a controller configured to control vehicle body orientation via drive force from a vehicle motive power source when the absolute value of the amplitude of the detected state quantity is less than a first predetermined value, via damping force from a variable-damping-force shock absorber instead of drive force from the motive power source when the absolute value of the amplitude is equal to or greater than the first predetermined value and less than a second predetermined value that is greater than the first predetermined value, and via braking force from a friction brake instead of damping force from the variable-damping-force shock absorber when the absolute value of the amplitude is equal to or greater than the second predetermined value.

12. A vehicle control method comprising:
controlling, using a controller, vehicle body orientation using drive force from a vehicle motive power source when the absolute value of the amplitude of a state quantity representing vehicle body orientation is less than a first predetermined value, using damping force from a variable-damping-force shock absorber instead of drive force from the motive power source when the absolute value of the amplitude is equal to or greater than the first predetermined value and less than a second predetermined value that is greater than the first predetermined value, and using braking force from a friction brake instead of damping force from the variable-damping-force shock absorber when the absolute value of the amplitude is equal to or greater than the second predetermined value.

\* \* \* \* \*